US008634833B2

(12) United States Patent
Das et al.

(10) Patent No.: US 8,634,833 B2
(45) Date of Patent: Jan. 21, 2014

(54) UNIQUELY IDENTIFYING TARGET FEMTOCELL TO FACILITATE ACTIVE HAND-IN

(75) Inventors: Soumya Das, San Diego, CA (US); Samir Salib Soliman, San Diego, CA (US); Jen Mei Chen, San Diego, CA (US); Andrei Dragos Radulescu, San Diego, CA (US); Damanjit Singh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/346,884

(22) Filed: Jan. 10, 2012

(65) Prior Publication Data

US 2013/0035098 A1    Feb. 7, 2013

Related U.S. Application Data

(60) Provisional application No. 61/515,707, filed on Aug. 5, 2011.

(51) Int. Cl.
*H04W 4/00* (2009.01)
(52) U.S. Cl.
USPC ...................................................... 455/435.1
(58) Field of Classification Search
USPC ............. 455/41.2, 445, 458, 456.1, 434, 436, 455/433, 456.3, 422.1, 435.1; 370/328, 370/259, 331, 254, 329
See application file for complete search history.

(56) References Cited

U.S. PATENT DOCUMENTS

| | | | |
|---|---|---|---|
| 8,064,909 B2 * | 11/2011 | Spinelli et al. | 455/436 |
| 2005/0009506 A1 | 1/2005 | Smolentzov et al. | |
| 2009/0163216 A1 * | 6/2009 | Hoang et al. | 455/450 |
| 2011/0194530 A1 | 8/2011 | Tinnakornsrisuphap et al. | |
| 2011/0263242 A1 | 10/2011 | Tinnakornsrisuphap et al. | |

OTHER PUBLICATIONS

International Search Report and Written Opinion—PCT/US2012/049652—ISA/EPO—Dec. 14, 2012.
Jaap C Haartsen: "The Bluetooth Radio System" IEEE Personal Communications, IEEE Communications Society, US, vol. 7, No. 1, Feb. 2000, pp. 28-36, XP011092382 ISSN: 1070-9916 *p. 32, left and right columns*.

* cited by examiner

*Primary Examiner* — Kiet Doan
(74) *Attorney, Agent, or Firm* — Jeffrey D. Jacobs

(57) ABSTRACT

A method for macrocell-to-femtocell hand-in includes: communicating a non-directed proximity request message from a femto-proxy system over an out-of-band (OOB) channel, the proximity request message configured to be received by any of a plurality of access terminals when in proximity to the femto-proxy system, the femto-proxy system comprising an OOB radio and a femtocell communicatively coupled with a core network element; receiving a proximity response message over the OOB link from an access terminal of the plurality of access terminals in response to the proximity request message, the proximity response message indicating that the access terminal is in proximity to the femto-proxy system; communicating a presence indication from the femtocell to a core network element indicating proximity of the access terminal to the femtocell; and facilitating active hand-in of the access terminal from a source macrocell of a macro network to the femtocell.

33 Claims, 19 Drawing Sheets

UNIQUELY IDENTIFYING TARGET FEMTOCELL TO FACILITATE ACTIVE HAND-IN

CROSS-REFERENCE TO RELATED APPLICATIONS

This application claims the benefit of U.S. Provisional Application No. 61/515,707, filed Aug. 5, 2011, entitled "Uniquely Identifying Target Femtocell to Facilitate Active Hand-In," which is hereby incorporated by reference for all purposes.

BACKGROUND

Information communication provided by various forms of networks is in wide use in the world today. Networks having multiple nodes in communication using wireless and wireline links are used, for example, to carry voice and/or data. The nodes of such networks may be computers, personal digital assistants (PDAs), phones, servers, routers, switches, multiplexers, modems, radios, access points, base stations, etc. Many client device nodes (also referred to as user equipment (UE) or access terminals (ATs)), such as cellular phones, PDAs, laptop computers, etc. are mobile and thus may connect with a network through a number of different interfaces.

Mobile client devices may connect with a network wirelessly via a base station, access point, wireless router, etc. (collectively referred to herein as access points). A mobile client device may remain within the service area of such an access point for a relatively long period of time (referred to as being "camped on" the access point) or may travel relatively rapidly through access point service areas, with cellular handoff or reselection techniques being used for maintaining a communication session or for idle mode operation as association with access points is changed.

Issues with respect to available spectrum, bandwidth, capacity, etc. may result in a network interface being unavailable or inadequate between a particular client device and access point. Moreover, issues with respect to wireless signal propagation, such as shadowing, multipath fading, interference, etc., may result in a network interface being unavailable or inadequate between a particular client device and access point.

Cellular networks have employed the use of various cell types, such as macrocells, microcells, picocells, and femtocells, to provide desired bandwidth, capacity, and wireless communication coverage within service areas. For example, the use of femtocells is often desirable to provide wireless communication in areas of poor network coverage (e.g., inside of 7 buildings), to provide increased network capacity, to utilize broadband network capacity for backhaul, etc.

SUMMARY

The disclosure is directed to systems and methods for supporting macrocell-to-femtocell hand-ins of active macro communications for mobile access terminals. A femto-proxy system detects an access terminal in its proximity using a broadcast technique (e.g., Bluetooth inquiry) over an out-of-band (OOB) channel using an OOB radio as part of a femto-proxy system. Having detected the access terminal in its proximity, a femtocell of the femto-proxy system communicates an OOB presence indicator to pre-register the access terminal with a core network element (e.g., a femto convergence system or other type of interface gateway) in communication with the macro network. When the femto convergence system receives a handoff request from the macro network implicating the pre-registered access terminal, the femto convergence system is able to reliably determine the appropriate femtocell to use for the hand-in according to the OOB presence indication.

An example of a method for macrocell-to-femtocell hand-in includes: communicating a non-directed proximity request message from a femto-proxy system over an out-of-band (OOB) channel, the proximity request message configured to be received by any of a plurality of access terminals when in proximity to the femto-proxy system, the femto-proxy system comprising an OOB radio and a femtocell communicatively coupled with a core network element; receiving a proximity response message over the OOB link from an access terminal of the plurality of access terminals in response to the proximity request message, the proximity response message indicating that the access terminal is in proximity to the femto-proxy system; communicating a presence indication from the femtocell to the core network element indicating proximity of the access terminal to the femtocell; and facilitating active hand-in of the access terminal from a source macrocell of a macro network to the femtocell.

Implementations of such a method may include one or more of the following features. The proximity response message includes an OOB identifier of the access terminal, and communicating the presence indication comprises communicating the OOB identifier from the femtocell to the core network element. The method further includes mapping the OOB identifier of the access terminal to an AT identifier identifying the access terminal on the macro network. The proximity response message includes an OOB identifier of the access terminal, the femto-proxy system is communicatively coupled with an enterprise server, and the method further includes: communicating the OOB identifier from the femtocell to the enterprise server; determining an access terminal identifier at the enterprise server according to a mapping of OOB identifiers and access terminal identifiers; and communicating the presence indication comprises communicating the access terminal identifier from the enterprise server to the core network element. The mapping is stored local to the femto-proxy system, and communicating the OOB presence indication includes: determining an access terminal identifier at the femto-proxy system according to the mapping; and communicating the access terminal identifier from the femto-proxy system to the core network element.

Alternatively or additionally, implementations of such a method may include one or more of the following features. The method further includes receiving, from the one of the plurality of access terminals, an access terminal identifier identifying the access terminal on the macro network, wherein communicating the presence indication comprises communicating the AT identifier. The access terminal identifier of the access terminal includes an International Mobile Subscriber Identity (IMSI). The access terminal identifier of the access terminal includes a Mobile Subscriber Integrated Services Digital Network.

Alternatively or additionally, implementations of such a method may include one or more of the following features. The method further includes: determining whether any of the plurality of access terminals is in active macro network communications after receiving the proximity response message over the OOB channel; and communicating the OOB presence indication from the femtocell to the core network element only when at least one of the plurality of access terminals determined to be proximate is determined to be in active macro communications. The determining whether any of the plurality of access terminals is in active macro communications includes detecting communications over macro channels using reverse-link sensing.

Alternatively or additionally, implementations of such a method may include one or more of the following features. The OOB link is a short-range wireless communication link. The non-directed proximity request message is an inquiry packet, and the proximity response message is an inquiry response packet. The method further includes receiving the non-directed proximity request at an access terminal in discoverable mode. The discoverable mode is a limited discoverable mode and the non-directed proximity request comprises a limited inquiry access code. The discoverable mode is a limited discoverable mode and the access terminal enters the limited discoverable mode in response to a trigger.

Alternatively or additionally, implementations of such a method may include one or more of the following features. The receiving comprises receiving the proximity response message over the OOB link from the access terminal of the plurality of access terminals only if the access terminal is of a prescribed class of device. The method further includes receiving a detect-mobile request from the core network element in response to a handoff request, where communicating the non-directed proximity request message is in response to receiving the detect-mobile request. The communicating the non-directed proximity request message is performed independently of a request from the core network element.

An example of a femto-proxy system includes: a femtocell configured to be communicatively coupled with a macro network via a core network element; an out-of-band (OOB) proxy communicatively coupled with the femtocell and configured to communicate with a plurality of access terminals over an OOB channel; and a communications management subsystem, communicatively coupled with the femtocell and the OOB proxy, and configured to: direct the OOB proxy to send a non-directed proximity request message over the OOB channel, the proximity request message configured to be received by any of the plurality of access terminals when in proximity to the femtocell; receive a proximity response message over the OOB channel from a particular access terminal of the plurality of access terminals in response to the proximity request message, the proximity response message indicating that the access terminal is in proximity to the femtocell; direct the femtocell to send a presence indication to the core network element indicating proximity of the particular access terminal to the femtocell; and facilitate active hand-in of the particular access terminal from a source macrocell of the macro network to the femtocell in response to receiving a transfer indication from the macro network in response to the presence indication.

Implementations of such a femto-proxy system may include one or more of the following features. The communications management subsystem is further configured to send an OOB identifier of the particular access terminal contained in the proximity response message to the core network element. The communications management subsystem is further configured to map an OOB identifier of the particular access terminal contained in the proximity response message to an AT identifier identifying the particular access terminal and to include the AT identifier in the presence indication. The communications management subsystem is further configured to determine whether the particular access terminal is in active macro network communication and to send the presence indication only if the particular access terminal is in active macro network communication. The communications management subsystem is configured to determine whether the particular access terminal is in active macro network communication using reverse-link sensing. The communications management subsystem is configured to direct the OOB proxy to send the non-directed proximity request message in response to receiving a detect-mobile request from a remote device. The communications management subsystem is configured to direct the OOB proxy to send the non-directed proximity request message independently of any request from the core network element.

Another example of a femto-proxy system includes: macro communicating means for communicating with a macro network via a core network element; out-of-band (OOB) communicating means for communicating with a plurality of access terminals over an OOB channel; presence means for sending a presence indication to the core network element indicating proximity of a particular access terminal to the femto-proxy system; and means for facilitating active hand-in of the particular access terminal from a source macrocell of the macro network to the femto-proxy system in response to receiving a transfer indication from the macro network in response to the presence indication.

Implementations of such a femto-proxy system may include one or more of the following features. The system further includes means for directing the OOB communicating means to send a non-directed proximity request message over the OOB channel, the proximity request message configured to be received by any of the plurality of access terminals when in proximity to the femto-proxy system, wherein the OOB communicating means are configured to receive a proximity response message over the OOB channel from a particular access terminal of the plurality of access terminals in response to the proximity request message, the proximity response message indicating that the access terminal is in proximity to the femto-proxy system. The presence means are further configured to send an OOB identifier of the particular access terminal contained in the proximity response message to the core network element. The system further includes means for mapping an OOB identifier of the particular access terminal contained in the proximity response message to an AT identifier identifying the particular access terminal, and the presence means are configured to include the AT identifier in the presence indication.

Additionally or alternatively, implementations of such a femto-proxy system may include one or more of the following features. The system further includes active macro means for determining whether the particular access terminal is in active macro network communication and the presence means are configured to send the presence indication only if the particular access terminal is in active macro network communication. The active macro means are is configured to determine whether the particular access terminal is in active macro network communication using reverse-link sensing. The OOB communicating means comprise means for receiving a non-directed proximity request message from the particular access terminal over the OOB channel, the proximity request message configured to be received by any femto-proxy system in proximity to the particular access terminal, the system further comprising means for directing the OOB communicating means to send a proximity response message over the OOB channel to the particular access terminal in response to the proximity request message, the proximity response message indicating that the femto-proxy system is in proximity to the particular access terminal.

Alternatively or additionally, implementations of such a femto-proxy system may include one or more of the following features. The OOB communicating means are configured to send the non-directed proximity request message in response to receiving a detect-mobile request from a remote device. The OOB communicating means are to send the non-directed proximity request message independently of a request from the core network element.

An example of a computer-readable medium of a femto-proxy system includes computer-readable instructions configured to cause a computer of the femto-proxy system to: send, via an out-of-band (OOB) proxy, a non-directed proximity request message over an OOB channel, the proximity request message configured to be received by any of a plurality of access terminals when in proximity to the femto-proxy system; receive a proximity response message over the OOB channel from a particular access terminal of the plurality of access terminals in response to the proximity request message, the proximity response message indicating that the access terminal is in proximity to the femto-proxy system; send a presence indication to the core network element indicating proximity of a particular access terminal to the femto-proxy system in response to receipt of a proximity response message over the OOB channel from the particular access terminal of the plurality of access terminals in response to the proximity request message, the proximity response message indicating that the access terminal is in proximity to the femto-proxy system; and facilitate active hand-in of the particular access terminal from a source macrocell of the macro network to the femto-proxy system in response to receipt a transfer indication from the macro network in response to the presence indication.

Implementations of such a computer-readable medium may include one or more of the following features. The instructions are configured to cause the OOB proxy to send an OOB identifier of the particular access terminal contained in the proximity response message to the core network element. The computer-readable medium further includes instructions configured to cause the computer to map an OOB identifier of the particular access terminal contained in the proximity response message to an AT identifier identifying the particular access terminal and to include the AT identifier in the presence indication. The computer-readable medium further includes active macro instructions configured to cause the computer to determine whether the particular access terminal is in active macro network communication and to send the presence indication only if the particular access terminal is in active macro network communication. The active macro instructions are configured to cause the computer to determine whether the particular access terminal is in active macro network communication using reverse-link sensing. The computer-readable medium further includes instructions configured to cause the computer to direct the OOB proxy to send the non-directed proximity request message in response to receiving a detect-mobile request from a remote device. The computer-readable medium further includes instructions configured to cause the computer to direct the OOB proxy to send the non-directed proximity request message in response to a trigger that is independent of a request from a macrocell network device.

An example of a method for associating an access terminal with a target femto-proxy system for macrocell-to-femtocell hand-in includes: communicating a non-directed inquiry from an access terminal to a femto-proxy system over a short-range out-of-band (OOB) channel; receiving a response over the OOB channel from the femto-proxy system in response to the non-directed inquiry; establishing and OOB link between the access terminal and the femto-proxy system; and sending a unique access terminal identifier from the access terminal to the femto-proxy system over the OOB link.

Implementations of such a method may include one or more of the following features. The method further includes sending the unique access terminal identifier from the femto-proxy system to a core network element. The method further includes detecting, by the femto-proxy system, whether any access terminal proximate to the femto-proxy system is in active macrocell communication, wherein the femto-proxy system sends the unique identifier to the core network element only if the corresponding access terminal is in active macrocell communication. The method further includes storing the unique access terminal identifier in memory in the core network element. The access terminal communicates the non-directed inquiry in response to a trigger comprising at least one of a location of the access terminal relative to the femto-proxy system, a radio frequency signature at the access terminal, or a call status of the access terminal.

An example of an access terminal includes: means for communicating a non-directed inquiry from an access terminal to a femto-proxy system over a short-range out-of-band (OOB) link; means for receiving a response over the OOB link from the femto-proxy system in response to the non-directed inquiry; means for establishing an OOB link between the access terminal and the femto-proxy system; and means for sending a unique access terminal identifier from the access terminal to the femto-proxy system over the OOB link.

Implementations of such an access terminal may include one or more of the following features. The means for communicating are configured to communicate the non-directed inquiry in response to a trigger comprising at least one of a location of the access terminal relative to the femto-proxy system, a radio frequency signature at the access terminal, or a call status of the access terminal.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only and not as a definition of the limits of the claims.

BRIEF DESCRIPTION OF THE DRAWINGS

A further understanding of the nature and advantages of examples provided by the disclosure may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, the reference numeral refers to all such similar components.

FIG. 12 shows a process of registering a mobile station for hand-in.

DETAILED DESCRIPTION

Figure 1:
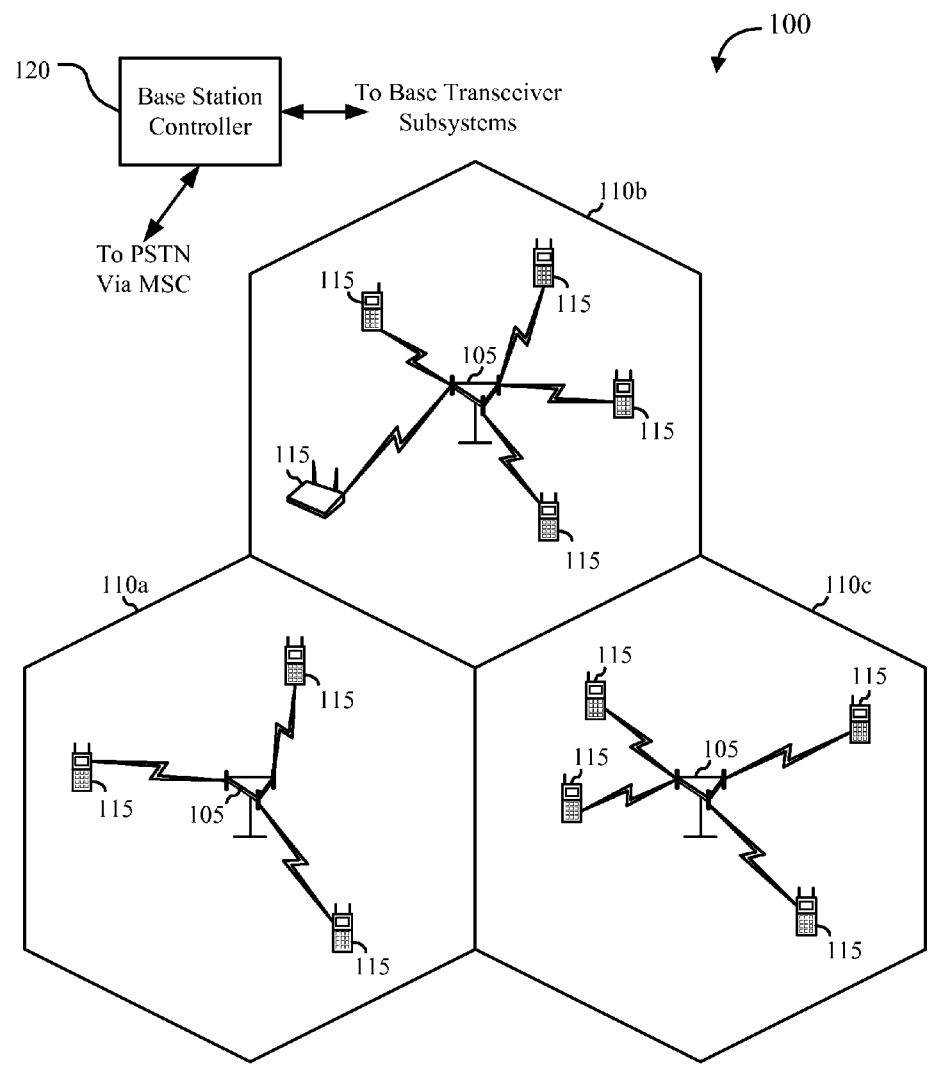
FIG. 1 shows a block diagram of a wireless communications system.

Techniques are described for supporting macrocell-to-femtocell hand-ins of active macro communications for mobile access terminals. A femto-proxy system detects an access terminal in its proximity using a broadcast technique (e.g., Bluetooth inquiry) over an out-of-band (OOB) channel using an OOB radio as part of a femto-proxy system. Having detected the access terminal in its proximity, the femto-proxy system communicates an OOB presence indicator to pre-register the access terminal with a core network element (e.g., a femto convergence system or other type of interface gateway) in communication with the macro network. When the femto convergence system receives a handoff request from the macro network implicating the pre-registered access terminal, the femto convergence system is able to reliably determine the appropriate femtocell to use for the hand-in according to the OOB presence indication.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above, as well as for other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, one or more of the methods described may be performed in an order different from that described, and various operations may be added, omitted, or combined. Also, features described with respect to certain examples may be combined in other examples.

Referring first to FIG. 1, a block diagram illustrates an example of a wireless communications system 100. The system 100 includes base transceiver stations (BTSs) 105, disposed in cells 110, mobile access terminals 115 (ATs), and a base station controller (BSC) 120. Terminology like access terminal (AT), mobile station (MS), and others may be used interchangeably herein and do not imply a particular network topology or implementation. For example, while the "AT" terminology may typically be used for circuit switched (e.g., CDMA 1X) networks, and the "MS" terminology may typically be used for packet data service (e.g., EV-DO, HRPD) networks, the techniques described herein may be applied in the context of any of these or other networks.

The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a SC-FDMA signal, etc. Each modulated signal may be sent on a different carrier and may carry pilot, overhead information, data, etc. The system 100 may be a multi-carrier LTE network capable of efficiently allocating network resources.

The BTSs 105 can wirelessly communicate with the ATs 115 via a base station antenna. The BTSs 105 are configured to communicate with the ATs 115 under the control of the BSC 120 via multiple carriers. Each of the BTSs 105 can provide communication coverage for a respective geographic area, here the cell 110a, 110-b, or 110-c. The system 100 may include BTSs 105 of different types, e.g., macro, pico, and/or femto base stations.

The ATs 115 can be dispersed throughout the cells 110. The ATs 115 may be referred to as mobile stations, mobile devices, user equipment (UE), or subscriber units. The ATs 115 here include cellular phones and a wireless communication device, but can also include personal digital assistants (PDAs), other handheld devices, netbooks, notebook computers, etc.

For the discussion below, the ATs 115 operate on (are "camped" on) a macro or similar network facilitated by multiple "macro" BTSs 105. Each macro BTS 105 may cover a relatively large geographic area (e.g., several kilometers in radius) and may allow unrestricted access by terminals with service subscription. The ATs 115 are also registered to operate on at least one femto network facilitated by a "femto" or "home" BTS 105. It will be appreciated that, while the macro BTSs 105 may typically be deployed according to network planning (e.g., resulting in the illustrative hexagonal cells 110 shown in FIG. 1), a femto BTS 105 may typically be deployed by individual users (or user representatives) to create a localized femtocell. The localized femtocell does not typically follow the macro network planning architecture (e.g., the hexagonal cells), although it may be accounted for as part of various macro-level network planning and/or management decisions (e.g., load balancing, etc.).

The AT 115 may generally operate using an internal power supply, such as a small battery, to facilitate highly mobile operations. Strategic deployment of network devices, such as femtocells, can mitigate mobile device power consumption to some extent. For example, femtocells may be utilized to provide service within areas which might not otherwise experience adequate or even any service (e.g., due to capacity limitations, bandwidth limitations, signal fading, signal shadowing, etc.), thereby allowing client devices to reduce searching times, to reduce transmit power, to reduce transmit times, etc. Femtocells provide service within a relatively small service area (e.g., within a house or building). Accordingly, a client device is typically disposed near a femtocell when being served, often allowing the client device to communicate with reduced transmission power.

For example, the femto cell is implemented as a femto access point (FAP) located in a user premises, such as a residence, an office building, etc. The location may be chosen for maximum coverage (e.g., in a centralized location), to allow access to a global positioning satellite (GPS) signal (e.g., near a window), and/or in any other useful location. For the sake of clarity, the disclosure herein assumes that a set of ATs 115 are registered for (e.g., on a white list of) a single FAP that provides coverage over substantially an entire user premises. The "home" FAP provides the ATs 115 with access to communication services over the macro network. As used herein, the macro network is assumed to be a wireless wide-area network (WWAN). As such, terms like "macro network" and "WWAN network" are interchangeable. Similar techniques may be applied to other types of network environments without departing from the scope of the disclosure or claims.

In example configurations, the FAP is integrated with one or more out-of-band (OOB) proxies as a femto-proxy system. As used herein, "out-of-band," or "OOB," includes any type of communications that are out of band with respect to the WWAN link. For example, the OOB proxies and/or the ATs 115 may be configured to operate using Bluetooth (e.g., class 1, class 1.5, and/or class 2), Bluetooth Low Energy (BLE), ZigBee (e.g., according to the IEEE 802.15.4-2003 wireless standard), WiFi, and/or any other useful type of communications out of the macro network band. OOB integration with the FAP may provide a number of features, including, for example, reduced interference, lower power femto discovery, etc.

Further, the integration of OOB functionality with the FAP may allow the ATs 115 attached to the FAP to also be part of an OOB piconet. The piconet may facilitate enhanced FAP functionality, other communications services, power management functionality, and/or other features to the ATs 115. These and other features will be further appreciated from the description below.

Figure 2A:
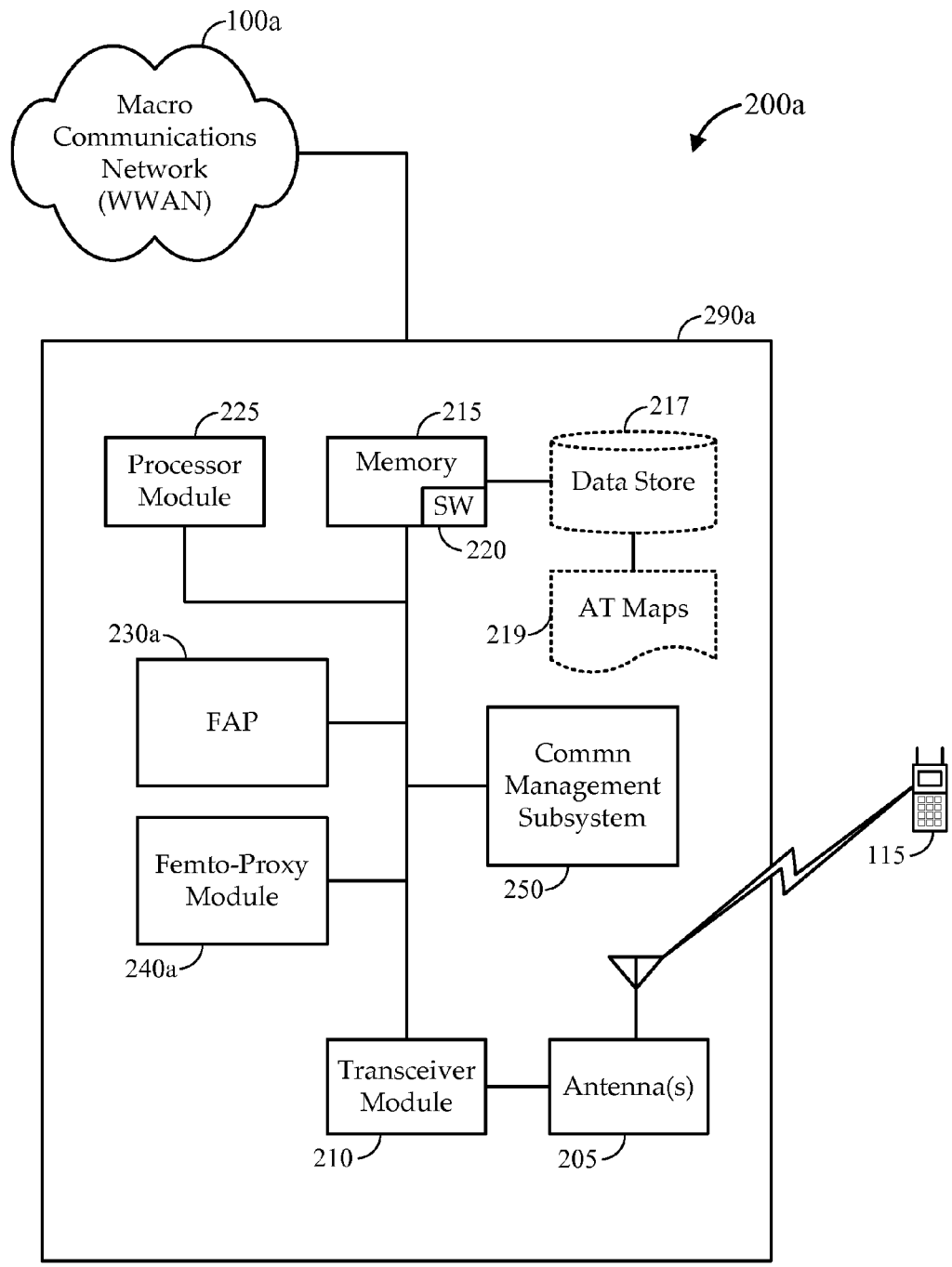
FIG. 2A shows a block diagram of an exemplary wireless communications system that includes a femto-proxy system.

FIG. 2A shows a block diagram of a wireless communications system 200a that includes a femto-proxy system (FPS) 290a. The femto-proxy system 290a includes a femto-proxy module 240a, an FAP 230a, and a communications management subsystem 250. The FAP 230a may be a femto BTS 105, as described with reference to FIG. 1. The femto-proxy system 290a also includes antennas 205, a transceiver module 210, memory 215, and a processor module 225, which each may be in communication, directly or indirectly, with each other (e.g., over one or more buses). The transceiver module 210 is configured to communicate bi-directionally, via the antennas 205, with the ATs 115. The transceiver module 210 (and/or other components of the femto-proxy system 290a) is also configured to communicate bi-directionally with a macro communications network 100a (e.g., a WWAN). For example, the transceiver module 210 is configured to communicate with the macro communications network 100a via a backhaul network. The macro communications network 100a may be the communications system 100 of FIG. 1.

The memory 215 may include random access memory (RAM) and read-only memory (ROM). In some embodiments, the memory 215 includes (or is in communication with) a data store 217 configured to store AT mappings 219. As described more fully below, these AT mappings 219 are used to facilitate certain FAP-assisted hand-in functionality. Typically the AT mappings 219 map an AT identifier (e.g., the International Mobile Subscriber Identity (IMSI) associated with the AT's 115 SIM card) with an OOB identifier corresponding to the AT's 115 OOB radio (e.g., the AT's 115 Bluetooth address). In certain embodiments, further mappings are maintained for each AT 115 by the AT mappings 219 including, for example, a public long code mask.

The memory 215 may also store computer-readable, computer-executable software code 220 containing instructions that are configured to, when executed, cause the processor module 225 to perform various functions described herein (e.g., call processing, database management, message routing, etc.). Alternatively, the software 220 may not be directly executable by the processor module 225 but be configured to cause the computer, e.g., when compiled and executed, to perform functions described herein.

The processor module 225 may include an intelligent hardware device, e.g., a central processing unit (CPU) such as those made by Intel® Corporation or AMD®, a microcontroller, an application specific integrated circuit (ASIC), etc. The processor module 225 may include a speech encoder (not shown) configured to receive audio via a microphone, convert the audio into packets (e.g., 30 ms in length) representative of the received audio, provide the audio packets to the transceiver module 210, and provide indications of whether a user is speaking Alternatively, an encoder may only provide packets to the transceiver module 210, with the provision or withholding/suppression of the packet itself providing the indication of whether a user is speaking The transceiver module 210 may include a modem configured to modulate the packets and provide the modulated packets to the antennas 205 for transmission, and to demodulate packets received from the antennas 205. While some examples of the femto-proxy system 290a may include a single antenna 205, the femto-proxy system 290a preferably includes multiple antennas 205 for multiple links. For example, one or more links may be used to support macro communications with the ATs 115. Also, one or more out-of-band links may be supported by the same antenna 205 or different antennas 205.

The femto-proxy system 290a is configured to provide both FAP 230a and femto-proxy module 240a functionality. For example, when the AT 115 approaches the femtocell coverage area, the AT's 115 OOB radio may begin searching for the OOB femto-proxy module 240a. Upon discovery, the AT 115 may have a high level of confidence that it is in proximity to the femtocell coverage area, and a scan for the FAP 230a can commence.

The scan for the FAP 230a may be implemented in different ways. For example, due to the femto-proxy module 240a discovery by the AT's 115 OOB radio, both the AT 115 and the femto-proxy system 290a may be aware of each other's proximity. The AT 115 scans for the FAP 230a. Alternatively, the FAP 230a polls for the AT 115 (e.g., individually, or as part of a round-robin polling of all registered ATs 115), and the AT 115 listens for the poll. When the scan for the FAP 230a is successful, the AT 115 may attach to the FAP 230a.

When the AT 115 is in the femtocell coverage area and attached to the FAP 230a, the AT 115 may be in communication with the macro communications network 100a via the FAP 230a. As described above, the AT 115 may also be a slave of a piconet for which the femto-proxy module 240a acts as the master. For example, the piconet may operate using Bluetooth and may include Bluetooth communications links facilitated by a Bluetooth radio (e.g., implemented as part of the transceiver module 210) in the FAP 230a.

Examples of the FAP 230a have various configurations of base station or wireless access point equipment. As used herein, the FAP 230a may be a device that communicates with various terminals (e.g., client devices (ATs 115, etc.), proximity agent devices, etc.) and may also be referred to as, and include some or all the functionality of, a base station, a Node B, and/or other similar devices. Although referred to herein as the FAP 230a, the concepts herein are applicable to access point configurations other than femtocell configuration (e.g., picocells, microcells, etc.). Examples of the FAP 230a utilize communication frequencies and protocols native to a corresponding cellular network (e.g., the macro communications network 100a, or a portion thereof) to facilitate communication within a femtocell coverage area associated with the FAP 230a (e.g., to provide improved coverage of an area, to provide increased capacity, to provide increased bandwidth, etc.).

The FAP 230a may be in communication with other interfaces not explicitly shown in FIG. 2A. For example, the FAP 230a may be in communication with a native cellular interface as part of the transceiver module 210 (e.g., a specialized transceiver utilizing cellular network communication techniques that may consume relatively large amounts of power in operation) for communicating with various appropriately configured devices, such as the AT 115, through a native cellular wireless link (e.g., an "in band" communication link). Such a communication interface may operate according to various communication standards, including but not limited to wideband code division multiple access (W-CDMA), CDMA2000, global system for mobile telecommunication (GSM), worldwide interoperability for microwave access (WiMax), and wireless LAN (WLAN). Also or alternatively, the FAP 230a may be in communication with one or more backend network interfaces as part of the transceiver module 210 (e.g., a backhaul interface providing communication via the Internet, a packet switched network, a switched network, a radio network, a control network, a wired link, and/or the like) for communicating with various devices or other networks.

As described above, the FAP 230a may further be in communication with one or more OOB interfaces as part of the transceiver module 210 and/or the femto-proxy module 240a. For example, the OOB interfaces may include transceivers that consume relatively low amounts of power in operation and/or may cause less interference in the in-band spectrum with respect to the in-band transceivers. Such an OOB interface may be utilized according to embodiments to provide low power wireless communications with respect to various appropriately configured devices, such as an OOB radio of the AT 115. The OOB interface may, for example, provide a Bluetooth link, an ultra-wideband (UWB) link, an IEEE 802.11 (WLAN) link, etc.

The terms "high power" and "low power" as used herein are relative terms and do not imply a particular level of power consumption. Accordingly, OOB devices (e.g., OOB femto-proxy module 240a) may simply consume less power than native cellular interface (e.g., for macro WWAN communications) for a given time of operation. In some implementations, OOB interfaces also provide relatively lower bandwidth communications, relatively shorter range communication, and/or consume relatively lower power in comparison to the macro communications interfaces. There is no limitation that the OOB devices and interfaces be low power, short range, and/or low bandwidth. Devices may use any suitable out-of-band link, whether wireless or otherwise, such as IEEE 802.11, Bluetooth, PEANUT, UWB, ZigBee, an IP tunnel, a wired link, etc. Moreover, devices may utilize virtual OOB links, such as through use of IP based mechanisms over a wireless wide area network (WWAN) link (e.g., IP tunnel over a WWAN link) that acts as a virtual OOB link.

Femto-proxy modules 240a may provide various types of OOB functionality and may be implemented in various ways. A femto-proxy module 240a may have any of various configurations, such as a stand-alone processor-based system, a processor-based system integrated with a host device (e.g., access point, gateway, router, switch, repeater, hub, concentrator, etc.), etc. For example, the femto-proxy modules 240a may include various types of interfaces for facilitating various types of communications.

Some femto-proxy modules 240a include one or more OOB interfaces as part of the transceiver module 210 (e.g., a transceiver that may consume relatively low amounts of power in operation and/or may cause less interference than in the in-band spectrum) for communicating with other appropriately configured devices (e.g., an AT 115) for providing interference mitigation and/or femtocell selection herein through a wireless link. One example of a suitable communication interface is a Bluetooth-compliant transceiver that uses a time-division duplex (TDD) scheme.

Femto-proxy modules 240a may also include one or more backend network interfaces as part of the transceiver module 210 (e.g., packet switched network interface, switched network interface, radio network interface, control network interface, a wired link, and/or the like) for communicating with various devices or networks. A femto-proxy module 240a that is integrated within a host device, such as with FAP 230a, may utilize an internal bus or other such communication interface in the alternative to a backend network interface to provide communications between the femto-proxy module 240a and other devices, if desired. Additionally or alternatively, one or more other interfaces, such as OOB interfaces, native cellular interfaces, Ethernet connections, etc., may be utilized to provide communication between the femto-proxy module 240a and the FAP 230a and/or other devices or networks. The connectivity discussed here with respect to the femto-proxy module 240a and the FAP 230a also apply to the femto-proxy module 240b and the FAP 230b discussed below.

Various communications functions (e.g., including those of the FAP 230a and/or the femto-proxy module 240a) may be managed using the communications management subsystem 250. For example, the communications management subsystem 250 may at least partially handle communications with the macro (e.g., WWAN) network, one or more OOB networks (e.g., piconets, AT 115 OOB radios, other femto-proxies, OOB beacons, etc.), one or more other femtocells (e.g., FAPs 230), ATs 115, etc. For example, the communications management subsystem 250 may be a component of the femto-proxy system 290a in communication with some or all of the other components of the femto-proxy system 290a via a bus.

Various other architectures are possible other than those illustrated by FIG. 2A. The FAP 230a and femto-proxy module 240a may or may not be collocated, integrated into a single device, configured to share components, etc. For example, the femto-proxy system 290a of FIG. 2A has an integrated FAP 230a and femto-proxy module 240a that at least partially share components, including the antennas 205, the transceiver module 210, the memory 215, and the processor module 225.

Figure 2B:
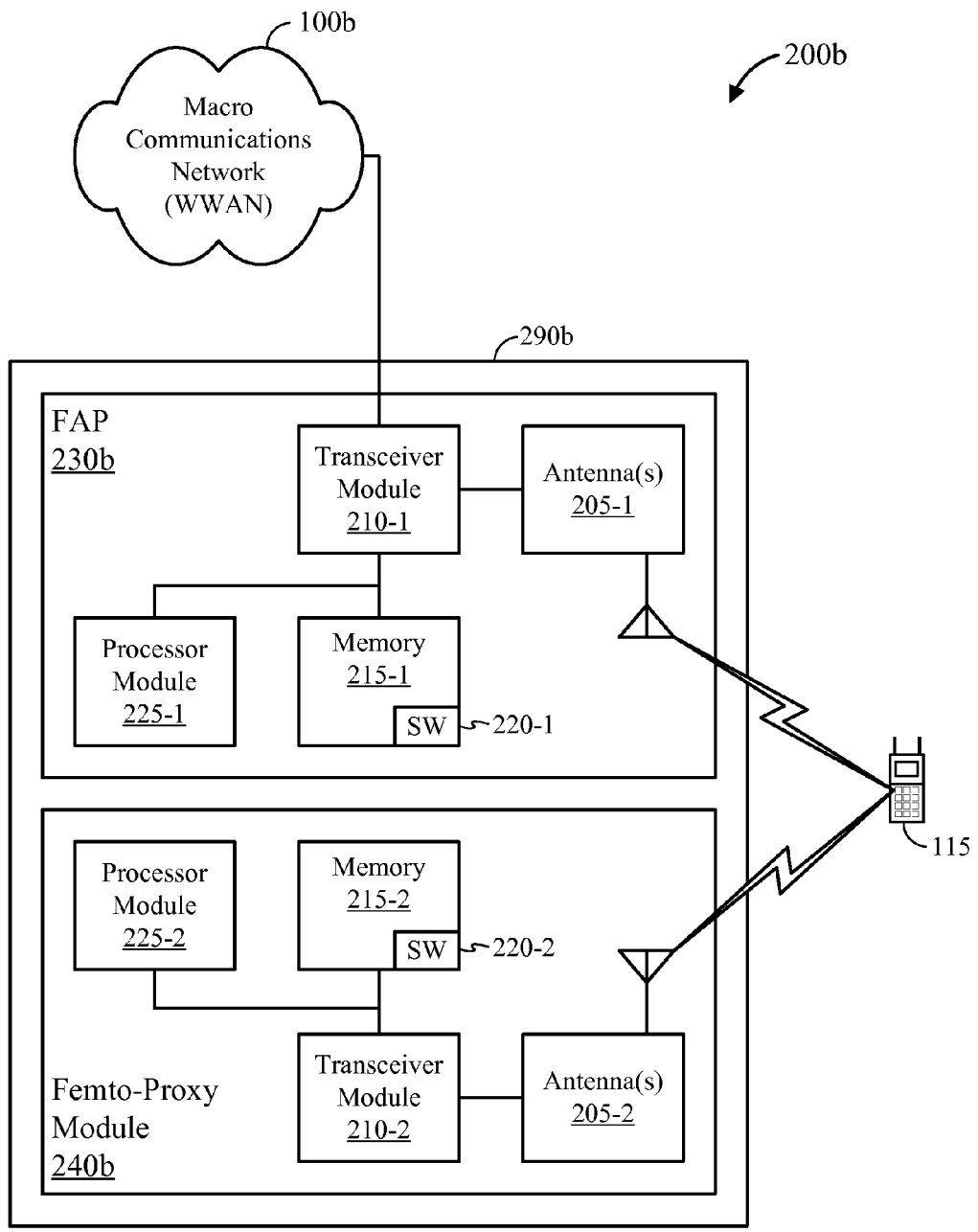
FIG. 2B shows a block diagram of an exemplary wireless communications system that includes an architecture of a femto-proxy system that is different from the architecture shown in FIG. 2A.

FIG. 2B shows a block diagram of a wireless communications system 200b that includes an architecture of a femto-proxy system (FPS) 290b that is different from the architecture shown in FIG. 2A. Similar to the femto-proxy system 290a, the femto-proxy system 290b includes a femto-proxy module 240b and a FAP 230b. Unlike the system 290a, however, each of the femto-proxy module 240b and the FAP 230b has its own antenna 205, transceiver module 210, memory 215, and processor module 225. Both transceiver modules 210 are configured to communicate bi-directionally, via their respective antennas 205, with ATs 115. The transceiver module 210-1 of the FAP 230b is illustrated in bi-directional communication with the macro communications network 100b (e.g., typically over a backhaul network).

For the sake of illustration, the femto-proxy system 290b is shown without a separate communications management subsystem 250. In some configurations, a communications management subsystem 250 is provided in both the femto-proxy module 240b and the FAP 230b. In other configurations, the communications management subsystem 250 is implemented as part of the femto-proxy module 240b. In still other configurations, functionality of the communications management subsystem 250 is implemented as a computer program product (e.g., stored as software 220-1 in memory 215-1) of one or both of the femto-proxy module 240b and the FAP 230b.

Figure 3:
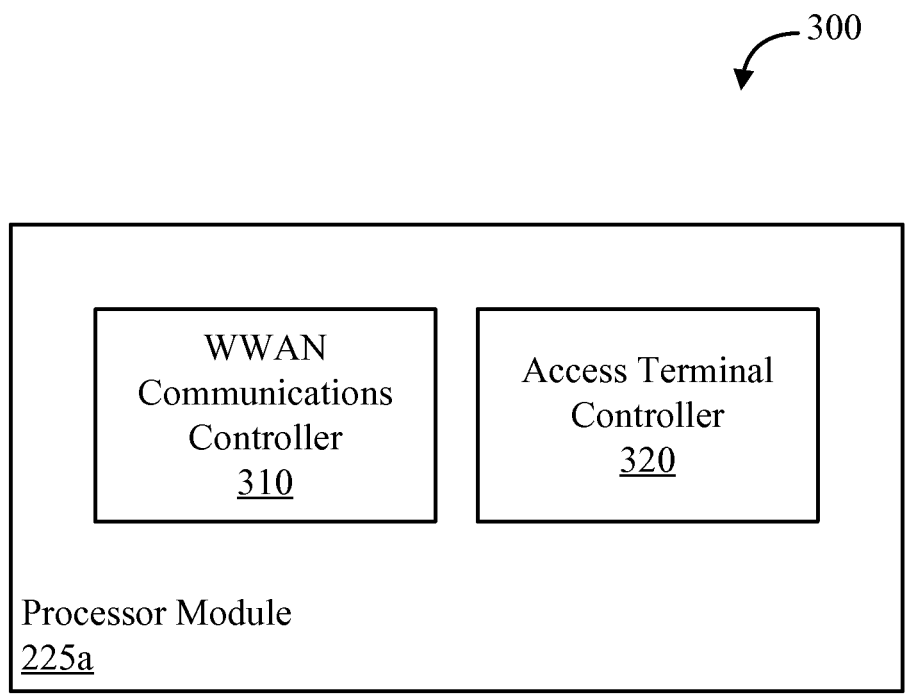
FIG. 3 shows a block diagram of an example of a processor module for implementing functionality of a communications management subsystem shown in FIG. 2A.

In yet other configurations, some or all of the functionality of the communications management subsystem 250 is implemented as a component of the processor module 225. FIG. 3 shows a block diagram 300 of a processor module 225a for implementing functionality of the communications management subsystem 250. The processor module 225a includes a WWAN communications controller 310 and an access terminal controller 320. The processor module 225a is in communication (e.g., as illustrated in FIGS. 2A and 2B) with the FAP 230 and the femto-proxy module 240. The WWAN communications controller 310 is configured to receive a WWAN communication (e.g., a page) for a designated AT 115. The access terminal controller 320 determines how to handle the communication, including affecting operation of the FAP 230 and/or the femto-proxy module 240.

Both the FAP 230a of FIG. 2A and the FAP 230b of FIG. 2B are illustrated as providing a communications link only to the macro communications network 100a. However, the FAP 230 may provide communications functionality via many different types of networks and/or topologies. For example, the FAP 230 may provide a wireless interface for a cellular telephone network, a cellular data network, a local area network (LAN), a metropolitan area network (MAN), a wide area network (WAN), the public switched telephone network (PSTN), the Internet, etc.

Figure 4A:
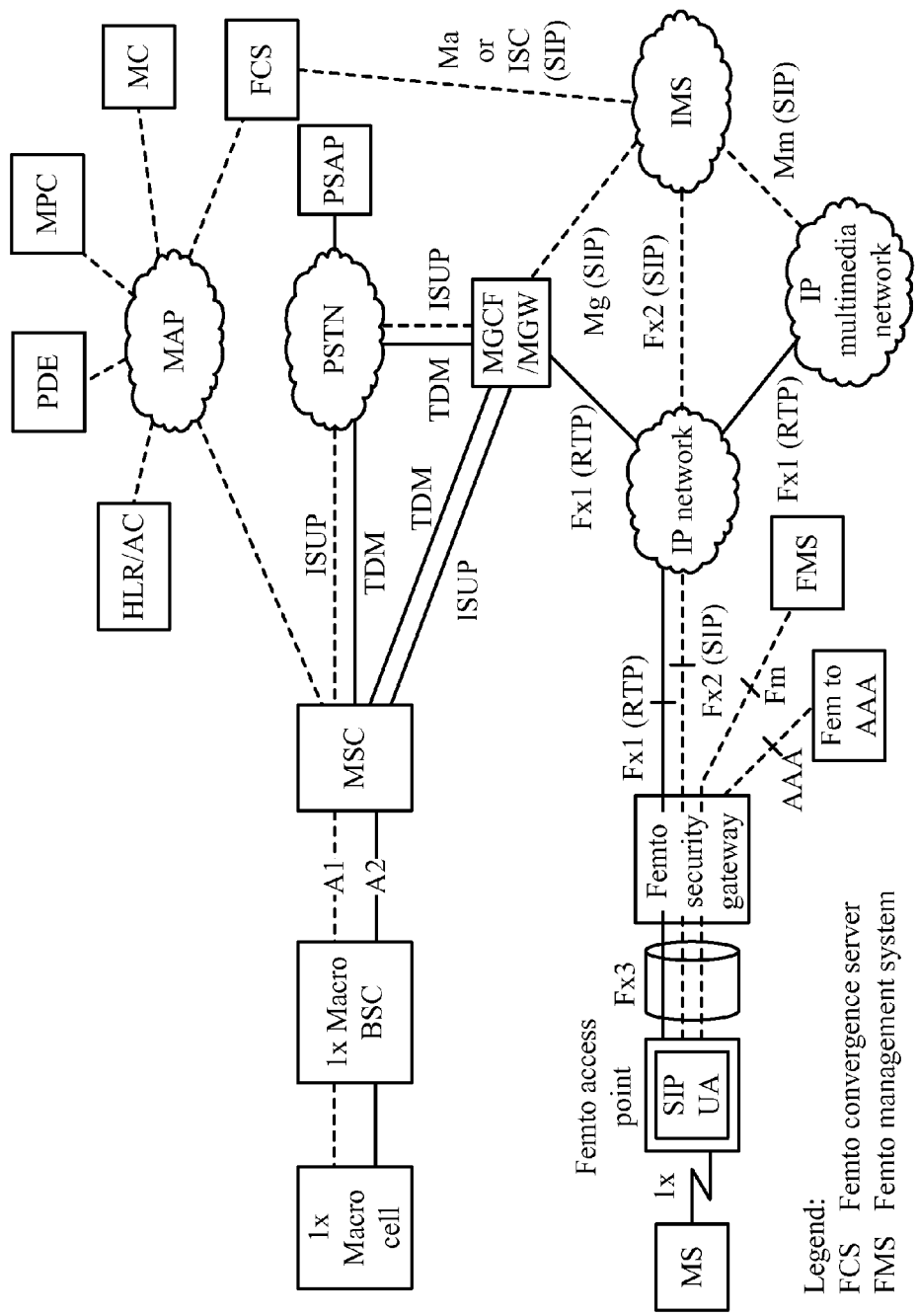
FIG. 4A shows detail regarding an example of a femtocell architecture for legacy circuit services.
Figure 4B:
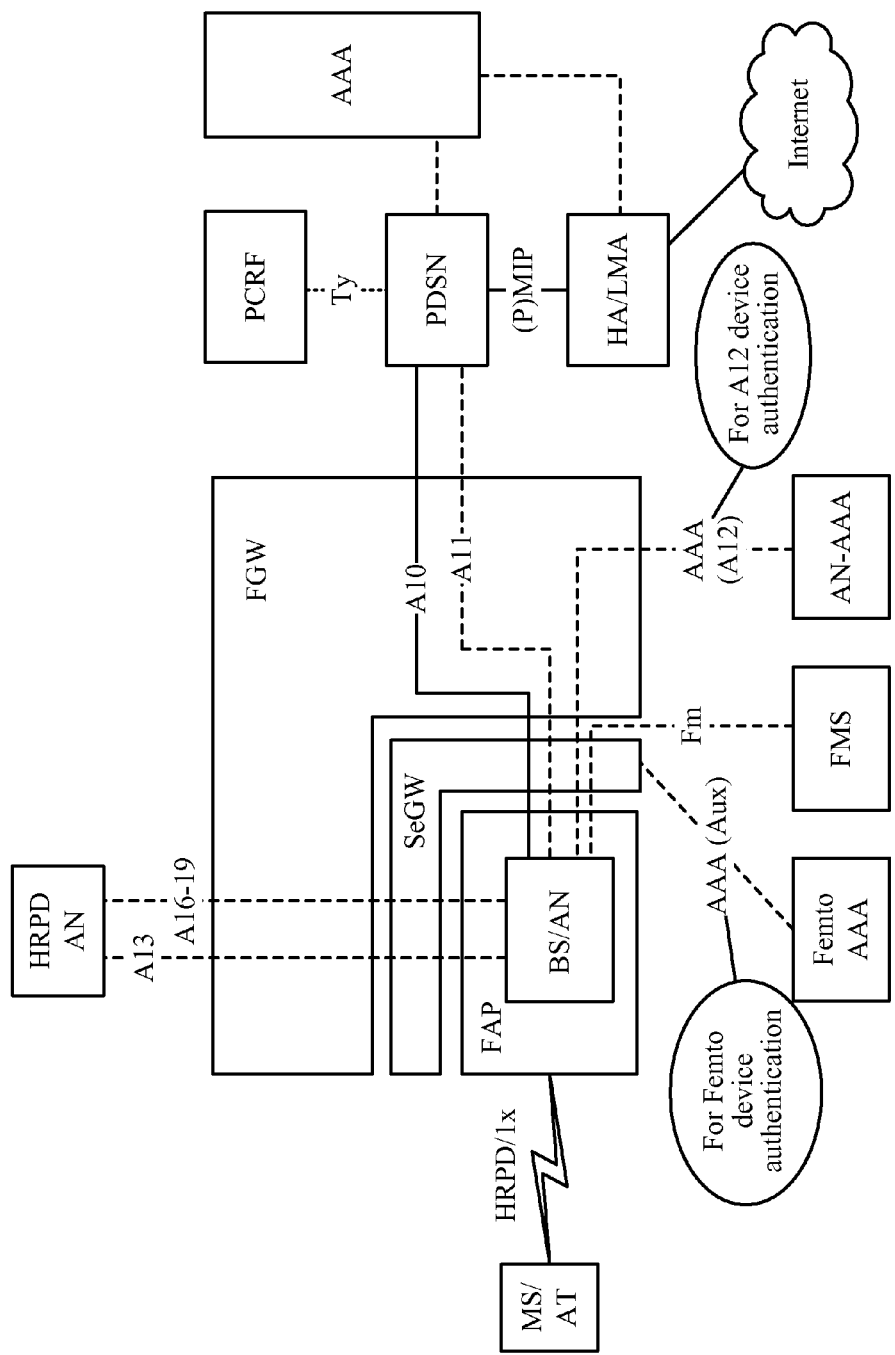
FIG. 4B shows detail regarding an example of a femtocell architecture for packet data service access using legacy interfaces.

FIGS. 4A and 4B show further detail with respect to femtocell architecture in communication networks for providing various services. Specifically, FIG. 4A shows detail regarding an exemplary femtocell architecture for legacy circuit services. For example, the network of FIG. 4A may be a CDMA 1x circuit switched services network. FIG. 4B shows detail regarding an exemplary femtocell architecture for packet data service access using legacy interfaces. For example, the network of FIG. 4B may be a 1x EV-DO (HRPD) packet data services network. These architectures illustrate possible portions of the communications systems and networks shown in FIGS. 1-3.

Figure 5:
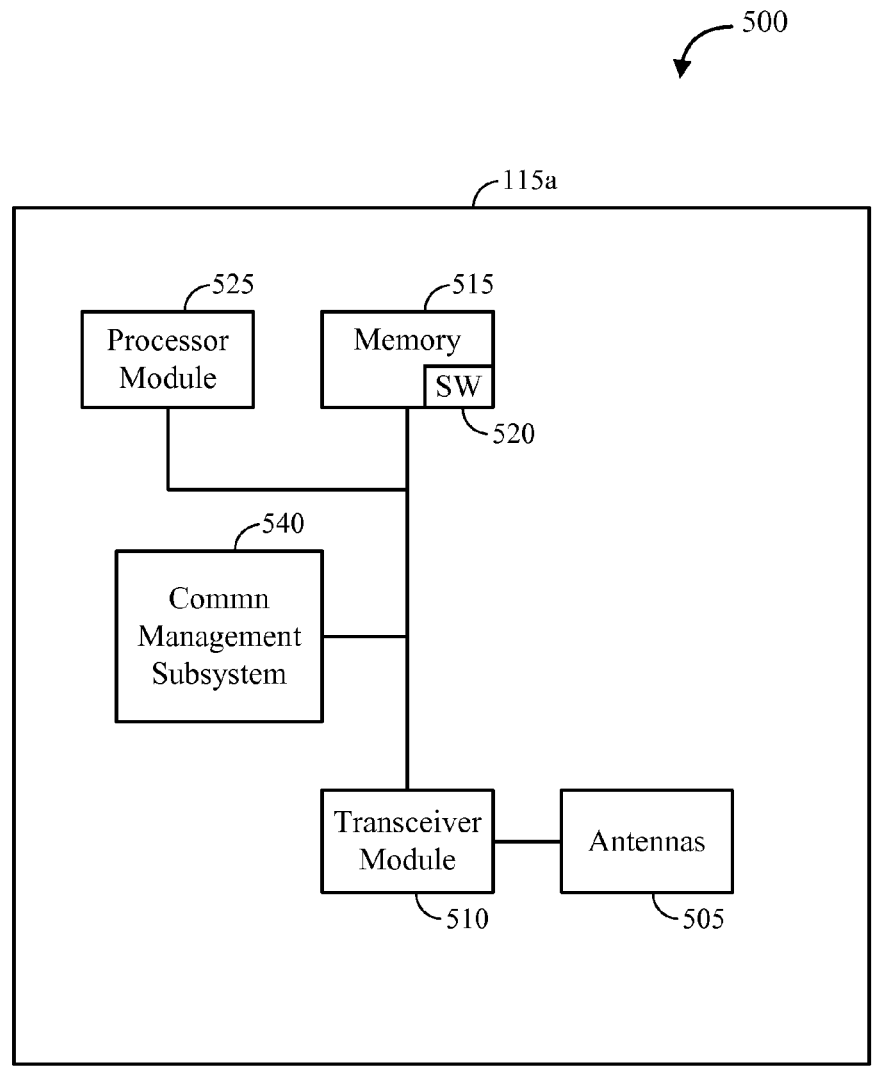
FIG. 5 shows a block diagram of an example of a mobile access terminal for use with the femto-proxy systems of FIGS. 3A and 3B in the context of the communications systems and networks of FIGS. 1-4B.

As described above, the femto-proxy systems 290 are configured to communicate with client devices, including the ATs 115. FIG. 5 shows a block diagram 500 of a mobile access terminal (AT) 115a for use with the femto-proxy systems 290 of FIGS. 2A and 2B in the context of the communications systems and networks of FIGS. 1-4B. The AT 115a may have any of various configurations, such as personal computers (e.g., laptop computers, netbook computers, tablet computers, etc.), cellular telephones, PDAs, digital video recorders (DVRs), internet appliances, gaming consoles, e-readers, etc. For the purpose of clarity, the AT 115a is assumed to be provided in a mobile configuration, having an internal power supply (not shown), such as a small battery, to facilitate mobile operation.

The AT 115a includes antennas 505, a transceiver module 510, memory 515, and a processor module 525, which each may be in communication, directly or indirectly, with each other (e.g., via one or more buses). The transceiver module 510 is configured to communicate bi-directionally, via the antennas 505 and/or one or more wired or wireless links, with one or more networks, as described above. For example, the transceiver module 510 is configured to communicate bi-directionally with BTSs 105 of the macro communications network (e.g., the communications system 100 of FIG. 1), and, in particular, with at least one FAP 230.

As described above, the transceiver module 510 may be configured to further communicate over one or more OOB links. For example, the transceiver module 510 communicates with a femto-proxy system 290 (e.g., as described with reference to FIGS. 2A and 2B) over both an in-band (e.g., macro) link to the FAP 230 and at least one OOB link to the femto-proxy module 240. The transceiver module 510 may include a modem configured to modulate the packets and provide the modulated packets to the antennas 505 for transmission, and to demodulate packets received from the antennas 505. While the AT 115a may include a single antenna 505, the AT 115a will typically include multiple antennas 505 for multiple links.

The memory 515 may include random access memory (RAM) and read-only memory (ROM). The memory 515 may store computer-readable, computer-executable software code 520 containing instructions that are configured to, when executed, cause the processor module 525 to perform various functions described herein (e.g., call processing, database management, message routing, etc.). Alternatively, the software 520 may not be directly executable by the processor module 525 but be configured to cause the computer, e.g., when compiled and executed, to perform functions described herein.

The processor module 525 may include an intelligent hardware device, e.g., a central processing unit (CPU) such as those made by Intel® Corporation or AMD®, a microcontroller, an application specific integrated circuit (ASIC), etc. The processor module 525 may include a speech encoder (not shown) configured to receive audio via a microphone, convert the audio into packets (e.g., 30 ms in length) representative of the received audio, provide the audio packets to the transceiver module 510, and provide indications of whether a user is speaking Alternatively, an encoder may only provide packets to the transceiver module 510, with the provision or withholding/suppression of the packet itself providing the indication of whether a user is speaking According to the architecture of FIG. 5, the AT 115a further includes a communications management subsystem 540. The communications management subsystem 540 may manage communications with the macro (e.g., WWAN) network, one or more OOB networks (e.g., piconets, femto-proxy modules 240, etc.), one or more femtocells (e.g., FAPs 230), other ATs 115 (e.g., acting as a master of a secondary piconet), etc. For example, the communications management subsystem 540 may be a component of the AT 115a in communication with some or all of the other components of the AT 115a via a bus. Alternatively, functionality of the communications management subsystem 540 is implemented as a component of the transceiver module 510, as a computer program product, and/or as one or more controller elements of the processor module 525.

The AT 115a includes communications functionality for interfacing with both the macro (e.g., cellular) network and one or more OOB networks (e.g., the femto-proxy module 240 link. For example, some ATs 115 include native cellular interfaces as part of the transceiver module 510 or the communications management subsystem 540 (e.g., a transceiver utilizing cellular network communication techniques that consume relatively large amounts of power in operation) for communicating with other appropriately configured devices (e.g., for establishing a link with a macro communication network via FAP 230) through a native cellular wireless link. The native cellular interfaces may operate according to one or more communication standards, including, but not limited to, W-CDMA, CDMA2000, GSM, WiMax, and WLAN.

Furthermore, the ATs 115 may also include OOB interfaces implemented as part of the transceiver module 510 and/or the communications management subsystem 540 (e.g., a transceiver that may consume relatively low amounts of power in operation and/or may cause less interference than in the in-band spectrum) for communicating with other appropriately configured devices over a wireless link. One example of a suitable OOB communication interface is a Bluetooth-compliant transceiver that uses a time-division duplex (TDD) scheme.

Active-Hand-In Embodiments

In many cases, it is desirable to support active hand-in from a macrocell (e.g., macro BTS 105 of FIG. 1) to the FAP 230 and/or active hand-out from the FAP 230 to the macro BTS 105 using handoffs to provide seamless voice and data service to active users (active ATs 115). Active handouts are relatively simple to implement and are supported by most operators with legacy macro networks 100 and ATs 115. However, active hand-in is challenging and is not typically supported by operators.

For example, as an AT 115 moves during the course of active communications with the macro network 100 (e.g., during a voice call, an active data transfer, etc.), a determination may be made that a handoff is needed (e.g., the current macro BTS 105 signal may become weak). The need for a handoff may be determined according to measurement reports sent by the active AT 115. The phrase "measurement report" may be generally associated with 3GPP networks, but is intended herein to include any similar types of measurement reporting in any similar type of network (e.g., including "PSMMs," or pilot strength measurements, in 3GPP2 networks).

The measurement reports include a measurement of the strength of the pilot observed by the AT 115 and the forward link cell identifier of the target cell. The cell identifier may be any identifier used by the macro network 100 to identify a particular cell. For example, the cell identifier may be a "PN offset" in a 3GPP2 network, a "PSC" (primary scrambling code) in a 3GPP network, etc. On a typical macro network 100, enough cell identifiers (e.g., PN Offsets) are available to substantially ensure that, given the geographical distribution of macro BTSs 105, each macro BTS 105 can effectively be uniquely identified by its cell identifier (e.g., by a base station controller (BSC) 120 in the macro network 100, a Mobile Switching Center (MSC) in the core of the network, etc.).

While macro BTSs 105 may effectively be uniquely identified by the macro network 100, there are typically not enough remaining cell identifiers to uniquely identify all FAPs 230 added to the network. For example, a typical macro network 100 may have 512 PN offset values available for assignment to all the cells in its network. PN offsets may be reused on different carriers, in different geographic regions, etc. to extend the number of cells that can effectively be identified without confusion. However, only a small portion of the PN offset values may be available for use by FAPs 230 (i.e., other than the values reserved for use by macro BTSs 105), and the number and density of FAPS may be relatively large in some areas. For example, only a small number of PN offset values must be reused among possibly hundreds of FAPs 230 per macro sector.

When a handoff is required for an active AT 115 to a macro BTS 105 (as a handoff from another macro BTS 105 or as a hand-out from a FAP 230), the cell identifier provided in the measurement report may be sufficient to reliably determine the appropriate macro BTS 105 for handoff. The active communication may be handed off to the correct target cell without ambiguity. However, when a handoff is required for an active AT 115 to a FAP 230 (as a hand-in from a macro BTS 105), the same cell identifier provided in the measurement report may be shared by multiple FAPs 230 in the same macro sector. As such, the cell identifier alone may be insufficient to reliably determine the appropriate FAP 230 for hand-in in all cases. For example, the AT 115 may be near its home FAP 230, and it may be desirable to hand-in to that home FAP 230, but another FAP 230 in the macro sector may be associated with the same cell identifier.

In some newer networks, additional identifiers are available that may mitigate or solve this issue. For example, in CDMA2000 networks, cells are upgraded to broadcast an access point identification message (APIDM), location information, and/or other information that may make identification of a particular FAP 230 based only on its cell identifier(s)

more unique and reliable. Upgraded ATs 115 can exploit new cell identifier(s), for example, by decoding the APIDM messages of neighboring cells and reporting the identifiers in measurement reports during active communications. The controllers (e.g., macro BSC 120 and MSC) can then include the APIDM in the handoff messages to uniquely identify the target FAP 230 (e.g., to the FCS). It is important to note that this technique is only available for communications between upgraded networks and upgraded ATs 115. For operators who do not want to upgrade the air interface, this technique is not available.

Operators of legacy networks (including those desiring to communicate with legacy ATs 115) may address this difficulty with active hand-in in different ways. Some typical networks do not support active hand-in at all. In the event that the hand-in would be the only way to maintain the active communications with the AT 115, the active communications may simply be lost (e.g., a call may be dropped when signals from macro BTSs 105 are lost, even when the AT 115 is otherwise in the FAP coverage area).

According to one technique for addressing the difficulty with active hand-in in legacy networks, some operators implement blind hand-off For example, when the measurement report includes a cell identifier that is shared by multiple FAPs 230 in the same macro sector, the network may blindly select any of the FAPs 230 having that cell identifier for the hand-in. If blind selection results in hand-in to an appropriate FAP 230, the hand-in may be successful. However, if blind selection results in hand-in to an inappropriate FAP 230 (e.g., one that is out of range of the AT 115, one for which the AT 115 is not authorized to attach, etc.), the active communications may be lost.

According to another technique, operators use reverse-link sensing to improve the type of blind hand-in discussed above. The reverse-link sensing may result in an educated guess or even an accurate determination as to the selection among FAPs 230 sharing the cell identifier identified for the hand-in. For example, as discussed above, the AT 115 in active communications with the macro network 100 sends a measurement report (e.g., MR, PSMM, etc.) to the source macro BTS 105 (the macro BTS 105 via which the AT 115 is currently communicating), and the measurement report includes the cell identifier (e.g., PN offset, PSC, etc.) of a target FAP 230 as the strongest neighboring cell. Based on the measurement report, the source macro BTS 105 determines to perform a hard hand-off The source macro BTS 105 sends a Handoff Required message to its source MSC (e.g., via its source BSC 120), and the source MSC sends a FACDIR2 message to a target femto convergence system (FCS) via core network messaging. As used herein, the FCS is intended to include any type of interface gateway for providing an interface between the FAPs 230 and the core network. The core network messaging may direct the target FCS to initiate the handoff Assuming that the target FCS cannot reliably determine the appropriate target FAP 230 (i.e., multiple FAPs 230 share the cell identifier of the measurement report), the target FCS sends a measurement request message to all FAPs 230 sharing the cell identifier. The measurement request may include the public long code mask (e.g., scrambling code, IMSI, etc.) of the AT 115. Typically, the measurement request is sent simultaneously to all potential target FAPs 230 to avoid waiting for serialized responses. Upon receiving this message, the FAPs 230 attempt to detect the AT 115 by its long code mask and measure the signal strength of the reverse link of the AT 115. Each FAP 230 responds to the target FCS providing at least the signal strength measured on the reverse link of the AT 115. In some cases, the FAPs 230 further determine whether the AT's 115 (e.g., their respective IMSIs) are authorized to access services via the FAP 230, and notify the FCS, accordingly. Further, some FAPs 230 may not send a measurement response. For example, certain network configurations allow FAPs 230 to omit responding with a measurement response message when detection of the AT 115 is not successful, when the measurement result is below an operator's configurable threshold, etc. Based on the measurement response results, the target FCS attempts to uniquely determine the appropriate target FAP 230, and continues with the active hand-in process.

Certain aspects of this reverse link measurement technique. One aspect is that, upon sending the Measurement Request message to the candidate target FAPs 230, the target FCS may typically start an instance of a timer to await the arrival of the corresponding Measurement Response messages from the FAPs 230. The duration that the FCS waits for responses from the FAPs 230 should be large enough to account for round-trip delays between the FCS and any of the candidate target FAPs 230 plus the value of a Measurement Response Timer field included in the Measurement Response Options for certain network components. This may impose an undesirable delay on the hand-in, which, in a worst-case, may cause the hand-in process to fail.

Another aspect of the reverse link measurement technique is that each FAP 230 may need an extra radio receiver to detect the presence of nearby active ATs 115 communicating with the macro network 100 by measuring reverse links of the ATs 115. It may be undesirable (e.g., it may increase the cost and complexity of the FAP 230 design and implementation) to include the extra radio receiver to enable reverse link sensing. Yet another aspect of the reverse link measurement technique is that reverse link measurements of ATs 115 by the FAPs 230 are not completely reliable. For example, when an AT 115 is at a cell edge, it may have higher transmit power, such that more than one FAP 230 may simultaneously detect the AT 115. Similarly, when an AT 115 is transmitting at a power that is too low, no FAPs 230 may detect the AT 115.

Figure 6A:
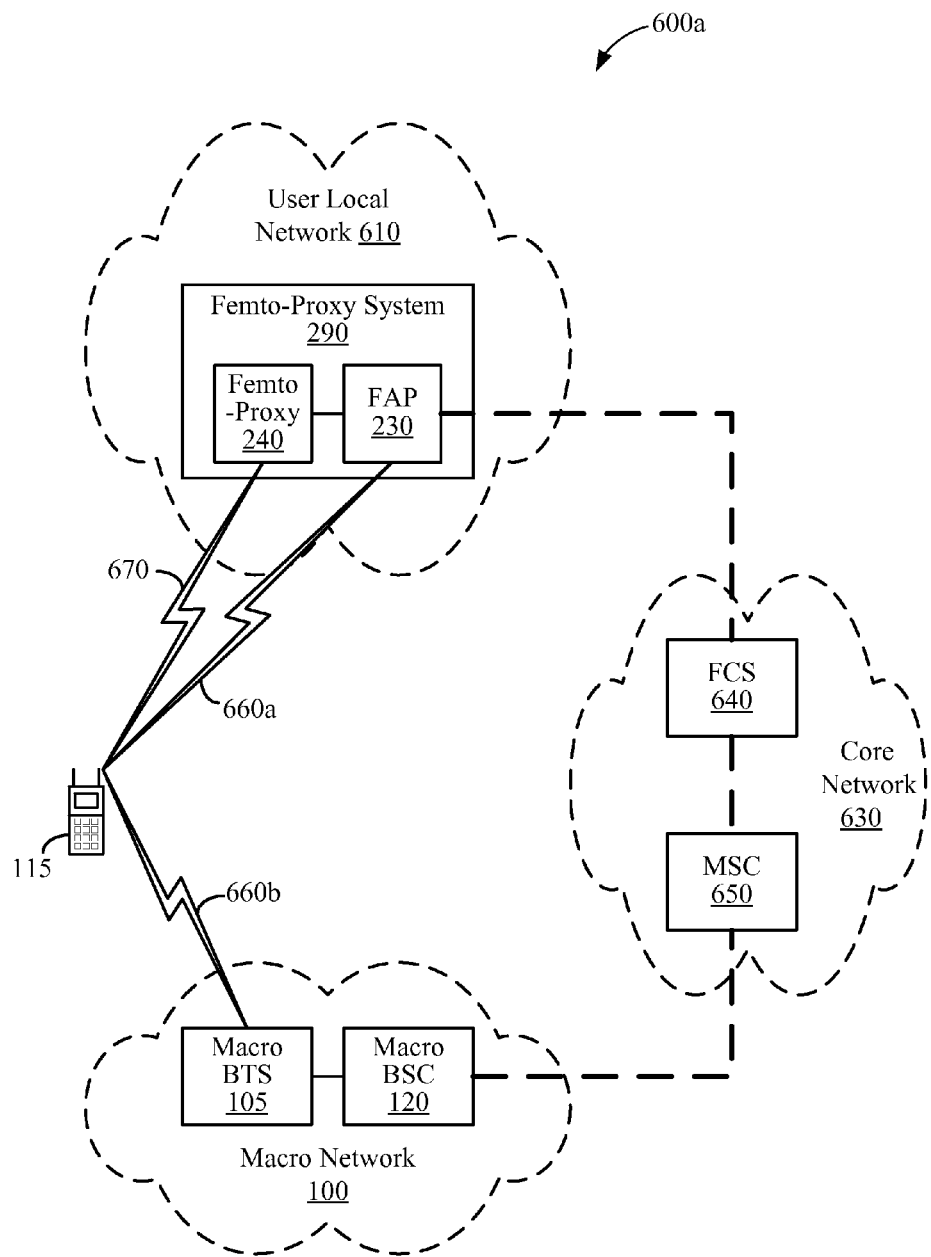
FIG. 6A shows a simplified network diagram of a communications system for facilitating active hand-in using a femto-proxy system having a femtocell integrated with a femto-proxy module.

It will now be appreciated that operators of legacy systems may be unable to reliably support active hand-ins to FAPs 230 using existing techniques. Embodiments include novel techniques for supporting active hand-ins for legacy networks and/or for legacy ATs 115. Turning to FIG. 6A, a simplified network diagram is shown of a communications system 600*a* for facilitating active hand-in.

The communications system 600*a* includes a macro network 100, a user local network 610, and a core network 630. The core network 630 includes, among other things, a femto convergence system (FCS) 640 and a mobile switching center (MSC) 650. The FCS 640 is in communication with a number of FAPs 230 (only one FAP 230 is shown for clarity), and the MSC 650 is in communication with multiple macro BTSs 105 via one or more macro BSCs 120 (only one macro BTS 105 is show for clarity). The FAP 230 is in communication with the macro network 100 via core network 630 elements, such that cellular communications may be facilitated through the FAP 230 using functionality of the FCS 640 and MSC 650.

An AT 115 in active communications with the macro BTS 105 (over a macro communications link 660) may approach a coverage area of the FAP 230. As described above, the macro network 100 (e.g., the macro BSC 120) determines that a handoff is needed based on a measurement report from the AT 115. The measurement report identifies the target FAP 230 by its cell identifier (e.g., its PN offset). A handoff request may then be sent by the MSC 650 to the target FCS 640 for identifying an appropriate FAP 230 for the hand-in.

As discussed, particularly where multiple FAPs 230 share a cell identifier, it may be difficult or impossible for the FCS 640 to reliably determine the appropriate target FCS 230 for hand-in using the cell identifier alone. Some embodiments exploit features of femto-proxy systems 290. As shown, the user local network 610 includes the FAP 230 functionality integrated with OOB functionality of a femto-proxy module 240 as part of a femto-proxy system 290. This OOB functionality is facilitated over an OOB communications link 670 that can be established between the AT 115 and the femto-proxy module 240.

While many different types of out-of-band communications may be used to facilitate functionality described here (e.g., as discussed above), the discussion below focuses on Bluetooth as facilitating the OOB communications of these embodiments. Bluetooth provides certain features. One feature is that Bluetooth radios are integrated into many ATs 115, so that the Bluetooth functionality can be exploited for many users without modifying their existing ATs 115. Another feature is that the tolerable path loss between two "Class 1.5" Bluetooth devices may be comparable or even higher than between a FAP 230 and an AT 115. In any given environment, this higher tolerable path loss can translate to higher effective range (e.g., facilitating FAP 230 discovery, handover, and/or interference mitigation, as described herein).

Yet another feature of Bluetooth is that the Bluetooth address (BD_ADDR) is a unique, 48-bit address used to identify each Bluetooth enabled device. The Bluetooth address is used when a device communicates with another device, and is divided into a 24-bit LAP (Lower Address Part), a 16-bit NAP (Non-significant Address Part), and an 8-bit UAP (Upper Address Part). The LAP is assigned by a manufacturer and is unique for each Bluetooth device, while UAP and NAP are part of an Organizationally Unique Identifier (OUI). Using the Bluetooth address, each Bluetooth adapter in any device can be identified according to a globally unique value.

As described more fully below, embodiments may operate in the context of a system, like the communications system 600 of FIG. 6, to support active hand-ins with minimal or no change to legacy macro networks 100 and/or to legacy ATs 115. One set of such embodiments uses modifications to ATs 115 and the FCS 640 to facilitate active hand-in. In particular, an OOB identifier of the FAP 230 is detected by the AT 115 and communicated as part of the measurement report to facilitate identification of the target FAP 230 by the FCS 640.

Each of the AT 115 and the FAP 230 has a unique Bluetooth device address (BD_ADDR) that is used for paging the other device (e.g., AT 115 pages the FAP 230 or the FAP 230 pages the AT 115). It is understood that the BD_ADDR of the other device is known by the paging device. The same or similar techniques may be used for other types of out-of-band addressing. For example, the devices may know each other's WiFi MAC address, etc. The AT 115 may then assist the macro network 100 in effecting the active hand-in.

After an OOB communications link 670 is established with the femto-proxy module 240, the AT 115 can communicate the cell identifier (e.g., PN offset) and the OOB identifier (e.g., Bluetooth device address) of the target FAP 230 to the MSC 650 as part of its measurement report. The FCS 640 maintains a mapping between the cell identifier and the OOB identifier, which can then be used to uniquely identify the target FAP 230 for active hand-in.

Various techniques may be used for AT 115 assisted active hand-in. For example, one technique involves upgrades at the AT 115 "air-interface" (i.e., new messages or modifications of existing messages are involved). Also, proper communication of new AT 115 messaging may involve changes to the macro BSCs 120, the MSC 650, the FCS 640, and the FAPs 230. These changes to the legacy macro network 100 may largely be software upgrades (rather than hardware upgrades), but operators may still be reluctant to implement the changes.

Another set of embodiments supports active hand-ins for both legacy macro networks 100 and legacy ATs 115. In particular, changes to the FAP 230 and the FCS 640 may allow for FAP 230 assisted active hand-in. Embodiments of FAP 230 assisted hand-in may be implemented without changes to the air-interface, the macro BSC 120, or the MSC 650. FAP 230 assisted hand-in exploits registration by FAPs 230 of ATs 115 at the FCS 640 (e.g., using OOB presence indication to effectively pre-register the AT 115 with the FCS 640). When a hand-off directive is received at the FCS 640 implicating an AT 115, registration of the AT 115 can be used by the FCS 640 to help determine the appropriate target FAP 230 for hand-in.

As described above with reference to FIG. 2A, embodiments of the FAP 230 maintain AT mappings 219. Typically, the AT mappings 219 map an AT identifier (e.g., the International Mobile Subscriber Identity (IMSI), Mobile Equipment Identifier (MEID), Electronic Serial Number (ESN), etc.) with an OOB identifier corresponding to the AT's 115 OOB radio (e.g., Bluetooth device address, WiFi MAC address, etc.). In certain embodiments, further mappings are maintained for each AT 115 by the AT mappings 219 including, for example, a public long code mask. When the FAP 230 is a restricted access femtocell, the AT mappings 219 may be maintained only for authorized users. For example, an access control list is maintained at the FAP 230 that includes or is associated with the AT mappings 219.

There may various ways to establish the AT mappings 219. According to one exemplary technique, the AT 115 calls a particular number, which may automatically trigger an OOB pairing (e.g., a Bluetooth pairing) between the AT 115 and the FAP 230. Thus the mapping between the AT identifier and OOB identifier is established. According to another exemplary technique, a user manually enters the AT's identifier (e.g., IMSI) and OOB identifier (e.g., BD_ADDR) into a user interface at the FAP 230. According to yet another exemplary technique, a user enters the mapping information via a portal (e.g., a web page), and the FAP 230 downloads the information (e.g., or the FAP 230 includes a web server and the portal directly addresses the FAP 230).

Active hand-in functionality described herein involves use of a femto-proxy system 290 having a FAP 230 integrated with an OOB femto-proxy 240. As illustrated in FIG. 6A, and as described in a number of exemplary configurations above, the OOB femto-proxy 240 includes an OOB device (e.g., an OOB radio) that is communicatively coupled with the FAP 230. For example, the FAP 230 and the OOB femto-proxy 240 may be physically integrated into a single housing or assembly (e.g., and in communication over a bus or some other internal connection), or the OOB femto-proxy 240 may be separately housed and may be in communication with the FAP 230 using a wired or wireless connection. Typically, the OOB femto-proxy 240 is located close enough to the FAP 230 so that proximity detection by the OOB femto-proxy 240 indicates proximity also to the FAP 230.

Figure 6B:
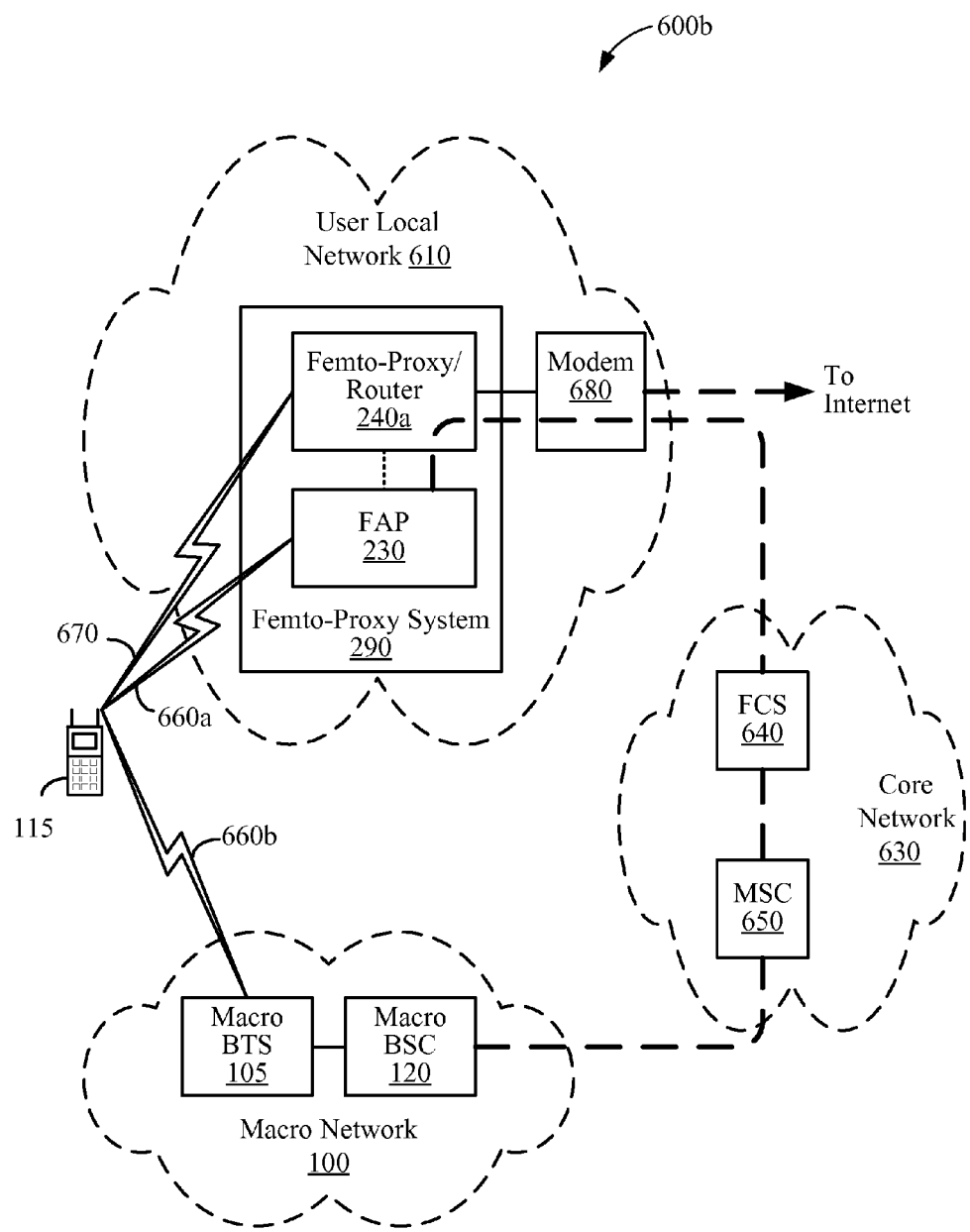
FIG. 6B shows a simplified network diagram of a communications system for facilitating active hand-in using a femto-proxy system having a femtocell sharing a subnet with a femto-proxy module.

In some other configurations, the OOB femto-proxy 240 is logically, rather than physically, integrated with the FAP 230 (e.g., the components can otherwise be logically associated with each other by the network). For example, even having the OOB femto-proxy 240 physically separated from the FAP 230, the components may be part of a common subnet so that proximity detection by the OOB femto-proxy 240 can be associated with proximity to the FAP 230. FIG. 6B shows a simplified network diagram of a communications system 600*b* for facilitating active hand-in in which the OOB femto-proxy 240 and the FAP 230 are logically integrated with respect to the core network 630.

As in FIG. 6A, the communications system 600*b* includes a macro network 100, a user local network 610, and a core network 630. The core network 630 includes, among other things, a femto convergence system (FCS) 640 and a mobile switching center (MSC) 650. The FCS 640 is in communication with a number of FAPs 230 (only one FAP 230 is shown for clarity), and the MSC 650 is in communication with multiple macro BTSs 105 via one or more macro BSCs 120 (only one macro BTS 105 is show for clarity). The FAP 230 is in communication with the macro network 100 via core network 630 elements, such that cellular communications may be facilitated through the FAP 230 using functionality of the FCS 640 and MSC 650.

As illustrated, the user local network 610 includes the FAP 230 and the OOB femto-proxy 240 as part of a femto-proxy system 290. The OOB femto-proxy 240 is shown as a combination OOB femto-proxy/router 240*a*. For example, broadband communications services are delivered to the user local network 610 via a modem 680. The modem 680 is then in communication with the OOB femto-proxy/router 240*a*, which is configured to provide the broadband communications services to a local subnet. For example, the OOB femto-proxy/router 240*a* is a WiFi router that acts as a WiFi "hot spot" for use by ATs 115 in its coverage area.

According to an exemplary scenario, an AT 115 moves into the proximity of the OOB femto-proxy/router 240*a* (e.g., within the WiFi coverage area), and the AT 115 detects or is detected by the OOB femto-proxy/router 240*a*. For example, the AT 115 detects a wireless network with a particular SSID (e.g., which may be previously known to the AT 115, previously authorized, etc.). Prior to providing service to the AT 115, the OOB femto-proxy/router 240*a* may attempt to assign an IP address to the AT 115. As part of the assignment process, the OOB femto-proxy/router 240*a* broadcasts a DHCP request to all the devices on the subnet.

The FAP 230 is configured to be a device on the subnet provided by the OOB femto-proxy/router 240*a*. The OOB femto-proxy 240 and the FAP 230 may or may not be physically collocated, physically integrated, etc. However, because the OOB femto-proxy 240 and the FAP 230 are part of the same subnet in the user local network 610, the FAP 230 receives the DHCP request from the OOB femto-proxy/router 240*a*. The DHCP request includes the AT's 115 WiFi MAC address (e.g., or other similar type of identifier).

At the FAP 230, a mapping is maintained between the AT's 115 MAC address and its identifier (e.g., the IMSI, MEID, ESN, etc.). When the FAP 230 sees the DHCP request with a MAC address that is recognized (e.g., for an AT 115 that is part of its access list, for an AT 115 known to be a cell phone, etc.), the FAP 230 sends the corresponding identifier for the AT 115 to the FCS 640 to facilitate active hand-in. Alternatively, the mapping between the MAC addresses and the identifiers of the ATs 115 may be maintained at the FCS 640. Accordingly, the FAP 230 can send the MAC address to the FCS 640, and the FCS 640 can retrieve the corresponding AT identifier.

Configuring the OOB femto-proxy 240 and the FAP 230 to be on the same subnet may provide a logical integration between the components of the femto-proxy system 290, even if those components are not physically or otherwise integrated. Mapping the WiFi MAC address to the AT identifier allows ATs 115 to be registered (e.g., pre-registered) substantially as described above with reference to other types of OOB femto-proxy 240 integration with the FAP 230 (e.g., as described with reference to FIG. 6A).

While only one FAP 230 is shown, the OOB femto-proxy/router 240*a* may be in communication with multiple FAPs 230. For example, in an enterprise context, a number of FAPs 230 may be used to extend cellular service coverage to a large area (e.g., an office building). Multiple FAPs 230, and even multiple OOB femto-proxies 240, may all be part of a common subnet (e.g., a local area network) facilitated by a router. When proximity is detected anywhere on the subnet, the router may be able to send out an appropriate DHCP request and/or other types of signaling to improve the reliability of active hand-ins to femtocells in the subnet.

The configurations described in FIGS. 6A and 6B are intended only to be illustrative, and not limiting. Other configurations are possible for providing the same or similar types of integrative functionality between OOB femto-proxies 240 and FAPs 230. For example, many configurations may allow OOB proximity detection to be used to facilitate reliable active hand-in to a particular FAP 230, according to various embodiments.

Figure 7A:
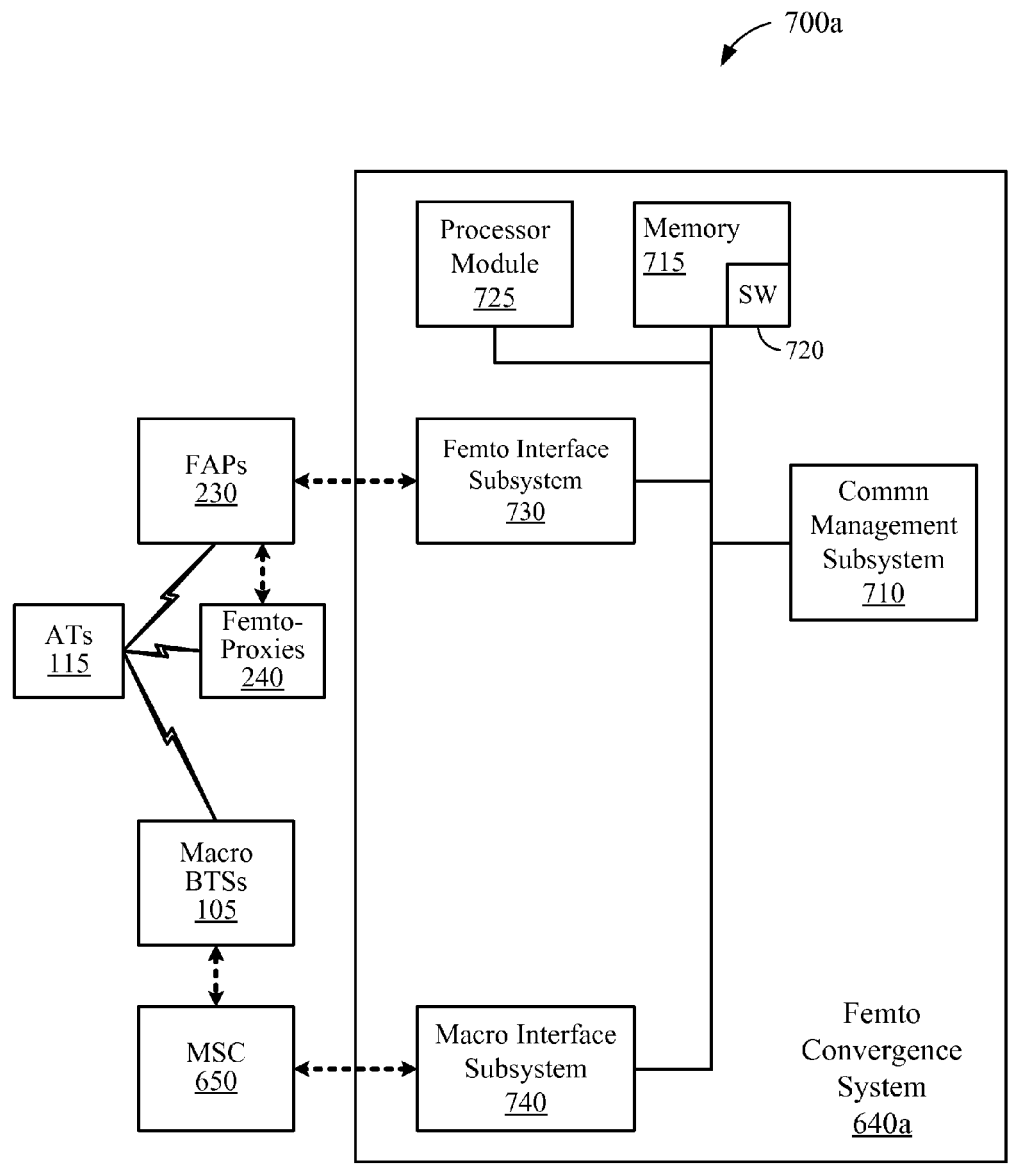
FIG. 7A shows a block diagram of a wireless communications system that includes a femto convergence system (FCS)
Figure 7B:
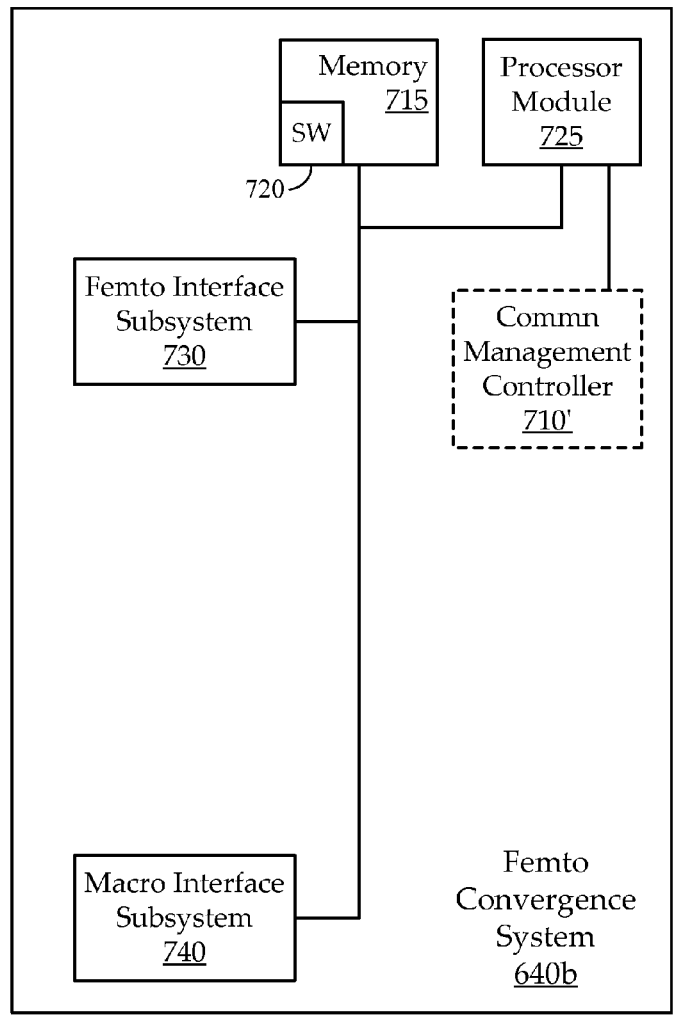
FIG. 7B shows a block diagram of an FCS that is an alternate configuration of the FCS of FIG. 7A.

To facilitate FAP 230 assisted hand-in, FAPs 230, like the one described in FIG. 2A, may interact with embodiments of FCSs 640, such as those described in FIGS. 7A and 7B. FIG. 7A shows a block diagram of a wireless communications system 700*a* that includes a femto convergence system (FCS) 640*a*. The FCS 640*a* includes a communications management subsystem 710, a femto interface subsystem 730, and a macro interface subsystem 740. The FCS 640*a* also includes memory 715 and a processor module 725. All the components of the FCS 640*a* may be in communication with each other directly or indirectly (e.g., over one or more buses).

For the sake of context and clarity, the femto interface subsystem 730 is shown in communication with FAPs 230, and the macro interface subsystem 740 is shown in communication with macro BTSs 105 (via an MSC 650 and/or one or more macro BSCs (not shown)). Various communications functions, including those involved in facilitating FAP 230 assisted hand-in, are implemented and/or managed using the communications management subsystem 710. For example, the communications management subsystem 710 may at least partially handle communications with macro network elements using functionality of the macro interface subsystem 740 and may at least partially handle communications with FAPs 230 using functionality of the femto interface subsystem 730. For example, the communications management subsystem 710 may be a component of the FCS 640*a* in communication with some or all of the other components of the FCS 640 via a bus.

The memory 715 may include random access memory (RAM) and read-only memory (ROM). In some embodiments, the memory 715 is configured to maintain registration-related information. As described more fully below, the registration-related information may include identifier mappings for FAPs 230, ATs 115, etc., as well as registration messages, flags, etc.

The memory 715 may also store computer-readable, computer-executable software code 720 containing instructions that are configured to, when executed, cause the processor module 725 to perform various functions described herein (e.g., call processing, database management, message routing, etc.). Alternatively, the software 720 may not be directly executable by the processor module 725 but be configured to cause the computer, e.g., when compiled and executed, to perform functions described herein.

The processor module 725 may include an intelligent hardware device, e.g., a central processing unit (CPU) such as those made by Intel® Corporation or AMD®, a microcontroller, an application specific integrated circuit (ASIC), etc. Embodiments of the processor module 725 may be configured to facilitate functionality, such as timer functionality. Further, embodiments of the processor module 725 include or facilitate some or all of the functionality of the communications management subsystem 710, the femto interface subsystem 730, or the macro interface subsystem 740.

For example, FIG. 7B shows a block diagram of an FCS 640*b* that is an alternate configuration of the FCS 640*a* of FIG. 7A. As with the FCS 640*a* of FIG. 7A, the FCS 640*b* of FIG. 7B includes a femto interface subsystem 730, a macro interface subsystem 740, memory 715, and a processor module 725, all in communication with each other directly or indirectly (e.g., over one or more buses). Unlike the FCS 640*a* of FIG. 7A, the FCS 640*b* of FIG. 7B includes communications management controller 710. Embodiments of the communications management controller 710 are implemented as part of the processor module 725 to provide substantially the same functionality as that of the communications management subsystem 710 shown in FIG. 7A.

As discussed above, embodiments of FCSs 640, such as those described in FIGS. 7A and 7B, can interact with FAPs 230, like the one described in FIG. 2A, to facilitate FAP 230 assisted hand-in. For example, when an AT 115 approaches a FAP 230, the FAP 230 detects the AT 115 in its proximity using an OOB link (e.g., Bluetooth paging procedure) or vice versa. In addition to or as part of the OOB detection procedure, the FAP 230 may determine whether the AT 115 is an authorized user. For example, the FAP 230 may check an access control list to determine whether the AT 115 is authorized to access macro communications services via the FAP 230.

Having discovered each other (and the FAP 230 having validated the AT 115 as an authorized user), the FAP 230 registers the AT 115 with the FCS 640. For example, the FAP 230 maintains an AT mapping 219 between the AT's 115 OOB identifier (e.g., the Bluetooth device address, WiFi MAC address) detected during the detection procedure and an identifier of the AT 115, like the AT's IMSI. The FAP 230 may register the AT 115 with the FCS 640 according to the AT's identifier.

In some embodiments, the OOB radio range (e.g., the edge of Bluetooth coverage) is greater than the FAP 230 coverage range, such that the detection and registration of the AT 115 may be performed before the AT 115 detects the FAP 230. Thus, in many cases, a, OOB presence indication may be communicated by the FAP 230 to the FCS 640 for the AT 115 before any handoff has been triggered by a measurement report of the AT 115 (i.e., the AT 115 may effectively be "pre-registered" upon receipt of any handoff request implicating the AT).

Various types of registration or pre-registration may be available in the macro network 100 and/or FAP 230 context. As used herein, "registration" and "pre-registration" are intended to refer specifically to registration of an AT 115 with an FCS 640 using OOB presence indication. When a handoff is triggered and a handoff request is received at the FCS 640 (e.g., from the MSC 650), the FCS 640 may be able to correlate the OOB presence indication with the handoff request (e.g., according to the AT's 115 identifier). With this information, the FCS 640 can uniquely identify the appropriate target FAP 230 and reliably proceed with the hand-in.

In some cases, the FCS 640 communicates the handoff request to the FAP 230 with a flag indicating that FCS 640 thinks that the AT 115 is in proximity of the FAP 230 based on the FAP's 230 prior OOB presence indication with the AT's identifier (e.g., IMSI). Having received the flag, the FAP 230 may try to detect the AT 115 again (e.g., over an OOB channel using the OOB femto-proxy, over a macro channel using reverse-link sensing, or both). If the AT 115 is no longer in the FAP's 230 proximity, the FAP 230 can reject the handoff request from the FCS 640. Further certain types of de-registration techniques may be used, as described below.

According to one de-registration technique, an AT 115 is explicitly deregistered by communicating an OOB absence indication to the FCS 640. For example, the OOB femto-proxy 240 and/or the FAP 230 may detect link loss with the AT 115 and send a de-registration request to the FCS 640 in the form of an OOB absence indication. According to another de-registration technique, an AT 115 may be de-registered if a certain amount of time elapses after registration without receiving a corresponding handoff request. According to yet another de-registration technique, an AT 115 may be explicitly or implicitly de-registered upon acknowledgement of handoff to the target FAP 230.

In some embodiments, registration is only performed for active ATs 115. In one illustrative scenario, as described above, registration is based on detection over an OOB link and subsequent communication to the FCS 640 of an OOB presence indication. In this scenario, the FAP 230 may not know whether the AT 115 is in WWAN idle state or active state (e.g., in a voice call). For idle handoff, the FAP's 230 pre-registration with the FCS 640 with the AT's identifier (e.g., IMSI) is ignored. For example, implicit de-registration may occur if a handoff request message does not arrive at FCS 640 prior to a timeout.

In another illustrative scenario, also as described above, registration is based on detection over the OOB link and then over the WWAN using reverse-link sensing. In this scenario, the FAP 230 knows the AT 115 is in WWAN active state. In some embodiments, idle ATs 115 are not pre-registered. For example, the FAP 230 will not send a registration request to the FCS 640 if the AT 115 is detected over the OOB link but not by reverse-link sensing (i.e., indicating that the AT 115 is in proximity but operating in WWAN idle state).

In yet another illustrative scenario, a handoff request message arrives at the FCS 640 (e.g., as a FACDIR2 message from the core network 630) implicating an AT 115. Even if the AT 115 has been pre-registered (e.g., by an OOB presence indication), the FCS 640 may send a handoff request to the FAP 230 with a flag indicating that the FCS 640 believes the AT 115 is in proximity of that specific FAP 230 based on the pre-registration. In some embodiments, the FAP 230 again tries to detect the AT 115 over the OOB link or using reverse-link sensing. If it fails, the FAP 230 may reject the handoff request; if it succeeds, the FAP 230 may accept the handoff request.

In the above scenarios, reverse-link sensing may be triggered by OOB link detection and not done otherwise. The reverse-link sensing may typically be performed using the AT's 115 public long code mask that is fixed (i.e., the private long code mask may not typically be used commercially). Accordingly, the reverse-link sensing can be configured at the FAP 230, such that mappings between the AT identifier (e.g., the IMSI), the OOB identifier of the AT 115 (e.g., Bluetooth device address or WiFi MAC address), and the public long code mask of the AT 115 are maintained at the FAP 230.

If the registration request is received at the FCS 640 after a corresponding handoff request implicating the AT 115 is received at the FCS 640, the FCS 640 may handle the hand-in in various ways. For example, even when the registration request is received after a corresponding handoff request, techniques described herein may be used to help facilitate active hand-in. Alternatively, there may be no hand-in, or techniques described above may be used, like blind hand-in, reverse-link sensing, etc.

The FAP 230 assisted hand-in techniques described herein may provide certain features. One feature is that the techniques may be used to reliably determine an appropriate target FAP 230 for active hand-in. Another feature is that pre-registration through communication of OOB presence indications may reduce or eliminate latencies relating to the measurement request and response timer used in reverse link sensing techniques. Yet another feature is that core network signaling (e.g., from measurement request and response) may be reduced. Still another feature is that the FAP 230 may be implemented without the extra radio used for reverse link sensing (however, some embodiments may use techniques described herein as enhancements to reverse-link sensing techniques, such that the extra radio may still be desired). Another feature is that no changes may be needed in the AT 115, the air interface, or the legacy infrastructure. The techniques may be implemented with changes only to the FAP 230 and the FCS 640.

Discoverable Mode Embodiments

While techniques may be used to page ATs 115 in round-robin or similar fashion to identify proximate ATs 115 over the OOB channel for facilitating accurate identification of target FAPs 230 for active hand-in, in some contexts, it may be more desirable to use other techniques. For example, for contexts in which hundreds of ATs 115 are part of the access control list of the FAP 230, where multiple FAPs 230 are working together to form a larger coverage area, or where it is desirable to readily provision and support guest ATs 115, where open FAP 230 access is desired, other techniques may be more desirable. These and/or other contextual features may be found in some enterprise or other large-scale femto-deployments.

To help address contextual features, some techniques use ATs 115 in a discoverable mode. The ATs 115 are in a discoverable mode and the FAPs are in an inquiry state, i.e., performing inquiry. These techniques use inquiry by the FAP and inquiry scan by mobiles, rather than page scan, for 00B proximity detection. Using Bluetooth (or similar) paging techniques, the ATs 115 may be in a "page scan" mode and only the AT 115 which is being paged will respond to the message. Further, paging a list of ATs 115 may involve sending a directed communication (e.g., a paging request message) to each AT 115 in the list. Accordingly, as the paging list grows, using paging for proximity detection may be impractical (e.g., the detection latency may become undesirable) or even impossible.

In contrast, inquiry may be implemented as a non-directed (e.g., broadcast or multicast) message to any of the ATs 115 within range. In Bluetooth implementations, the ATs 115 would be in "inquiry scan" (e.g., "discoverable") mode, rather than in "page scan" mode, at least while in proximity to the FPS 290. Typically, power usage by ATs 115 in an inquiry scan mode of operation may be similar to power usage in page scan modes of operation. The FPS 290, specifically the femto-proxy 240, will do the inquiry.

In a proactive approach or proactive method, the FPS 290 proactively performs inquiry and detects mobiles in the vicinity of the FPS 290 from inquiry responses and reports to the FAP-GW about the mobile. This method advantageously has low detection latency. Using this method, ATs will be detected even when they are in WWAN idle mode as RSSI sensing is not perfect as discussed below.

In a reactive approach or reactive method, when the FAP-GW receives a handoff request, the FAP-GW requests the FPS 290 to perform inquiry and report the mobiles 115 in the vicinity of the FPS 290 detected from inquiry responses. This method advantageously detects ATs 115 mostly when they are in active call mode although the proactive approach may have lower detection latency.

Another approach is to have the ATs 115 perform inquiry, for example based on triggers when the ATs 115 are in proximity of the FPS 290 with the FPS 290 in inquiry scan mode, i.e., discoverable mode. The triggers are associated with proximity to the FPS 290, e.g., location (e.g., as determined by Global Positioning Satellite system, other Satellite Positioning System, or other technique), radio frequency (RF) signature (e.g., BTS plus RSSI combination), etc.

A mapping is used between AT identity and OOB identity because the AT identity is not typically part of an OOB information exchange. There can also be different approaches for the mapping between AT identity, (preferably a unique identifier of the AT 115 such as its IMSI), and an OOB identity such as the AT's Bluetooth address, BD_ADDR. One approach that is a long term solution is that some Core Network element (e.g. FAP-GW) maintains a mapping between the mobile's unique identifier and the mobile's OOB identifier, e.g., mapping between the mobile's IMSI and the mobile's BD_ADDR. The network benefits from having knowledge of the coexistence matrix of the modems of the mobile 115 for multi-radio operations. Another approach is an application that runs on the FPS 290 and the AT 115 that sends the mapping information between the AT's IMSI and the AT's BD_ADDR to the FPS 290 after setting up an OOB link, e.g., a BT link once the AT 115 is detected by the FAP 230. In addition to OOB security, application layer security ensures that the IMSI is sent to the FPS 290 in a secure way.

The mapping may be sent only once and for subsequent times can be retrieved from a local database at the FPS 290 or an enterprise network. For enterprise users, the mapping can also be maintained by an enterprise server and can be available to the FPSs 290. This mapping would be for mobiles 115 associated with the enterprise, and would be supplemented for guest mobiles 115 (i.e., mobiles 115 not previously associated with the enterprise).

Femto Performing Inquiry

Proactive Approach

Operators may treat discoverable modes in different ways. For example, certain operators allow ATs 115 to remain in discoverable mode, while other operators allow ATs 115 to remain in discoverable mode only for a limited amount of time (e.g., a few minutes). Accordingly, certain implementations include a mobile application configured to trigger the AT 115 to be in "discoverable" mode when in proximity to the FPS 290.

For example, a user of the AT 115 identifies a geographic location of the target FPS 290 (e.g., by using an application interface to select a current GPS position while in proximity to the FPS 290, to enter an address of the FPS 290, etc.). The application monitors the location (or other parameter(s), e.g., RF profile, macro cell signature) of the AT 115 to determine whether the AT 115 is in geographic proximity to the FPS 290. When the AT 115 is in proximity to the FPS 290 (or approaching the proximity of the FPS 290), the application directs the AT 115 to activate its OOB radio, if appropriate, and to enter discoverable mode.

The FPS 290, in particular the femto-proxy module 240, may communicate a proximity request message as an inquiry request. For example, a general inquiry access code (GIAC) can be used to inquire for any proximate Bluetooth device, or a dedicated inquiry access code (DIAC) can be used to inquire for any proximate Bluetooth device of a certain prescribed (allowed/acceptable) class of devices (CoD). Typically, the inquiry messages are communicated on a previously agreed sequence of thirty-two of seventy-nine available Bluetooth frequencies.

The recipient AT 115 responds with an inquiry response message (e.g., an FHS packet). The inquiry response message may include the OOB address (e.g., BD_ADDR), and or other relevant parameters. When DIAC messaging is used, only those proximate Bluetooth devices of the correct CoD (e.g., only mobile ATs 115) may respond. When GIAC messaging is used, any proximate Bluetooth device of any CoD may respond, and it may be desirable to post-filter the responses to ignore those originating from undesired classes of device.

The inquiry procedure may typically take a sufficiently short amount of time (e.g., less than ten seconds). Further, because the inquiry message is not directed, there may be no round-robin latency. Accordingly, the detection latency may be substantially unaffected by the number of ATs 115 in the access control list of the FPS 290.

While an enterprise deployment will typically include numerous FPSs to provide coverage of the enterprise, some of the FPSs may not be enabled with OOB radio (e.g., Bluetooth) for assisting with active macrocell to femtocell hand-in. For example, a deployment could use FPSs with OOB capability only to cover a reception area and other entrances of the enterprise. In this arrangement, few ATs will be in range of the OOB-enabled FPSs for long amounts of time sending inquiry responses. This arrangement can help limit the impact on power consumption at the ATs and interference due to multiple devices sending inquiries at about the same time.

The ATs 115 can be configured to operate in a limited OOB discoverable mode in situations where a limited period of time in discoverable mode will suffice, e.g., during temporary conditions or for a specific event. The ATs 115 in the limited discoverable mode can respond to an FPS that makes a limited inquiry, e.g., using a limited inquiry access code (LIAC). The femto-proxy system 290 can send out the LIAC and the ATs 115 can enter the limited discoverable mode based on one or more triggers. Preferably, the AT's OOB device is not in the limited discoverable mode for more than a threshold time $T_{gap}$, e.g., one minute. An HCI_Write_Current_IAC_LAP command is used to produce the IACs that the OOB device is simultaneously scanning for during inquiry scans. All of the ATs 115 support at least one IAC (the GIAC) while some OOB devices support additional IACs.

Systems described above could be adapted to provide inquiry-based proximity detection functionality. Certain aspects of inquiry-based modes of operation may facilitate proximity detection in contexts involving numerous, e.g., hundreds, of mobiles in an enterprise context, e.g., distributed throughout a building, campus, a geographic region, etc.

FIGS. 8A-8D show four examples of such distributed femto deployments 1800, each having multiple FAPs 230 included in multiple femto-proxy systems (i.e., 290a-290n). Each femto-proxy system 290 is in communication with a core network 630 element, for example, a femto convergence system 640. As described herein, an OOB proxy 240 (not shown) of each femto-proxy system 290 detects proximity of ATs 115. When in proximity, the femto-proxy system 290 maps the AT's 115 OOB information to certain identifiers according to an AT map 219. Those identifiers can be used by the core network 630 to facilitate reliable active hand-in of the AT 115 from a source macro BTS 105 to a target FAP 230.

Figure 8A:
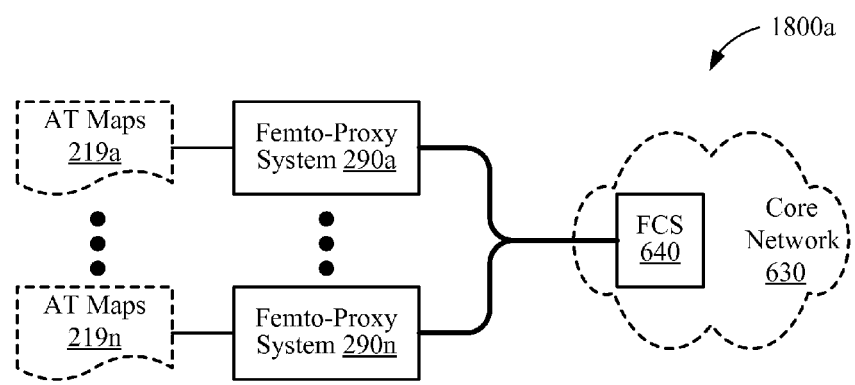
FIGS. 8A-8D show block diagrams of distributed femto deployments each having multiple femto access points included in multiple femto-proxy systems.

Turning particularly to FIG. 8A, the deployment 1800a is shown with each femto-proxy system 290 storing some or all of the AT maps 219. Some such deployments use femto-proxy systems 290 like the one illustrated in FIG. 2A or 2B. For example, when an AT 115 is detected in proximity to the femto-proxy system 290 over an OOB channel, the OOB information is mapped to relevant identifiers according to a locally stored AT map 219. The relevant identifiers are then communicated from the FAP 230 of the femto-proxy system 290 to the core network 630 (e.g., to the FCS 640) for facilitating active hand-in. Different implementations may distribute the AT maps 219 in different ways. For example, each femto-proxy system 290 can have an identical, synchronized copy of the entire AT map 219, portions of the AT maps 219 can be distributed across multiple FAPs 230, etc.

Figure 8B:
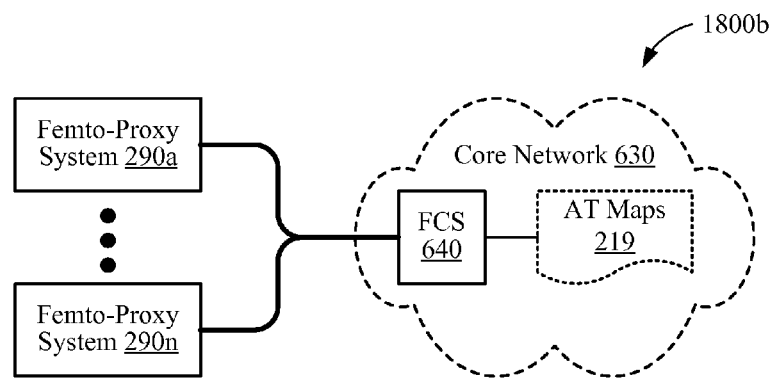

Turning to FIG. 8B, the deployment 1800b is shown with a single AT map 219 stored at the core network 630 (e.g., by the FCS 640). Some such deployments use an FCS 640 like the one illustrated in FIG. 7A or 7B. For example, when an AT 115 is detected in proximity to the femto-proxy system 290 over an OOB channel, the OOB information is sent to the FCS 640 (or another core network 630 element). The OOB information is mapped at the core network 630 to relevant identifiers according to the AT map 219 and used to facilitate active hand-in.

Suppose, for example, that a service provider desires to support active hand-in across its provider network. The provider upgrades its core network 630 to maintain AT maps 219. As a customer travels from home to office to coffee shop, etc., the customer's AT 115 can be detected by femto-proxy systems 290 distributed throughout the network. The centrally stored AT maps 219 can then be used to enhance the customer's experience by facilitating reliable active hand-ins (e.g., without the customer needing to register with each femto-proxy system 290 in all those locations).

Figure 8C:
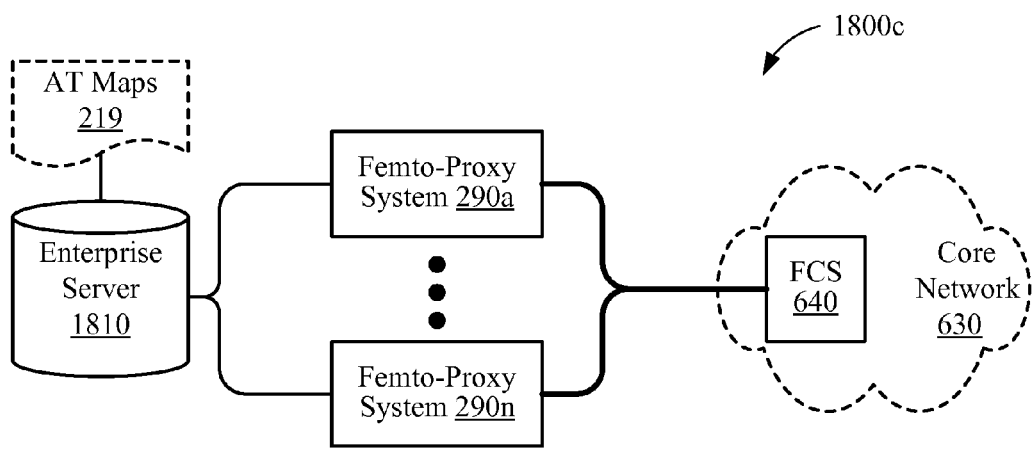

Turning to FIG. 8C, the deployment 1800c is shown with a single AT map 219 stored at an enterprise server 1810. Each femto-proxy system 290 is in communication with both the core network 630 (e.g., the FCS 640) and the enterprise server 1810. For example, when an AT 115 is detected in proximity to the femto-proxy system 290 over an OOB channel, the OOB information is sent to the enterprise server 1810, where it is mapped to relevant identifiers according to the enterprise-wide AT map 219. The relevant identifiers are then communicated to the core network 630 (e.g., to the FCS 640) for facilitating active hand-in. Depending on the configuration of the enterprise network, the relevant identifiers can be sent back to the FAPs 230, from where they can be sent to the core network 630 (e.g., as in FIG. 8A); or they can be sent through some other enterprise network element to the core network 630.

Suppose that an enterprise desires to support active hand-ins throughout an entire building, across a campus, etc. For example, an illustrative enterprise building has eight floors supporting around 1,000 employees. It is determined that, for reliable coverage, each floor needs about three FAPs 230, such that the entire building can be reliably covered using around twenty-five FAPs 230. The FAPs 230 all have access to AT maps 219 maintained at an enterprise server 1810. Any employees or guests can be provisioned through the enterprise server 1810 to facilitate reliable active hand-ins to any of the FAPs 230 in the building (e.g., without needing to register with each FAP 230 in the building).

Figure 8D:
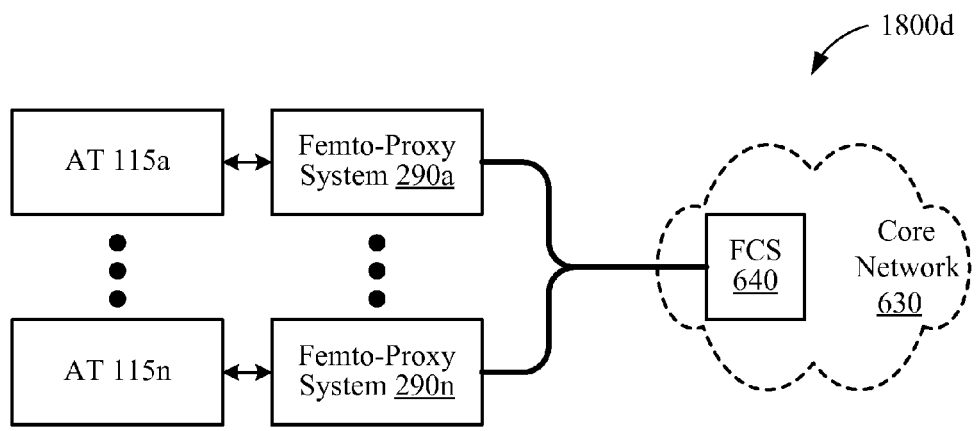

Turning to FIG. 8D, the deployment 1800d includes the ATs 115a-115n, femto-proxy systems 290a-290n, and a core network 630 that includes an FCS 640. An application running in each of the ATs 115 can provide an identifier of the AT 115 though an OOB link to the FAP 230 of the femto-proxy system 290. The femto-proxy system 290 can map the identifier to femto-proxy system 290 and provide the mapping to the core network 630. The deployment 1800d can be used in conjunction with the deployment 1800a and/or the deployment 1800c to provide mapping for new mobiles for which mapping information is not already available.

The deployments 1800 of FIGS. 8A-C represent some of many possible distributed deployments. Similar techniques can also be used on non-distributed deployments, such as deployments having only a single FAP 230 (e.g., a residential deployment). These and/or other systems are provided as a context for OOB proximity detection techniques, including techniques using inquiry mode proximity detection to facilitate active hand-in.

Figure 9:
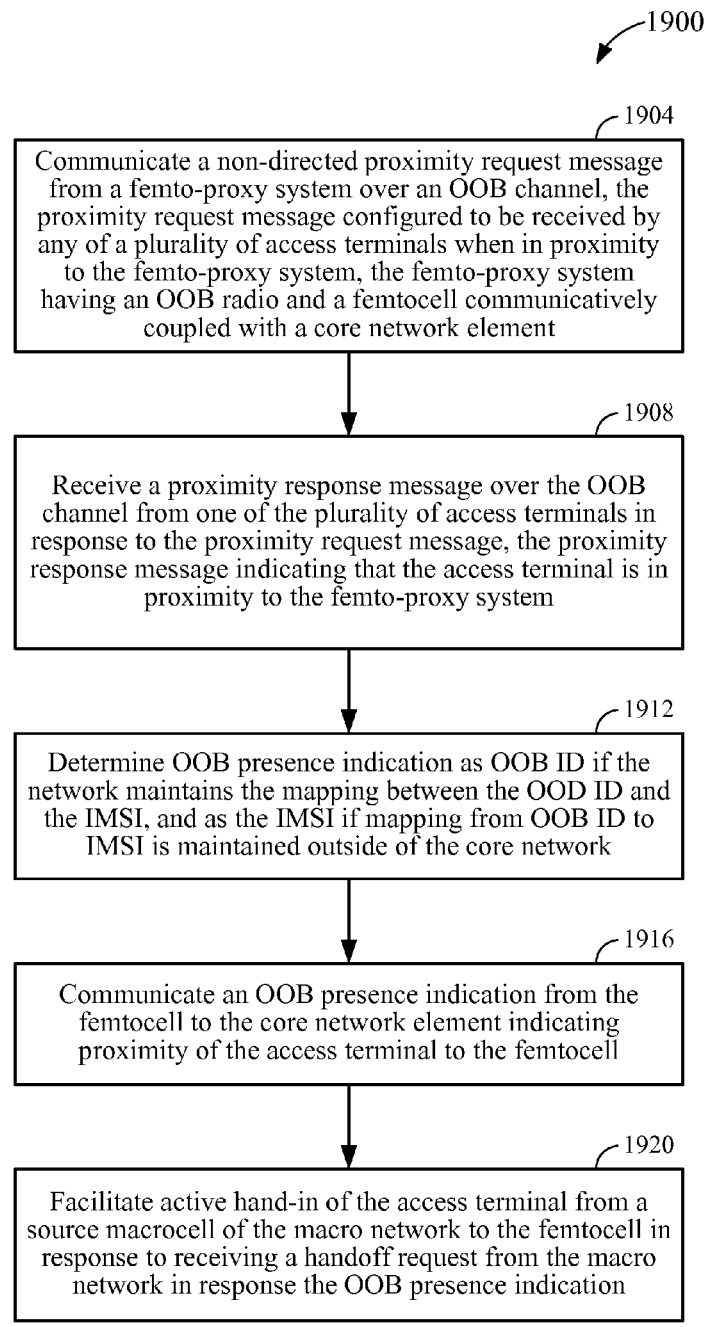
FIG. 9 shows a flow diagram of an exemplary method for facilitating active hand-in of an access terminal to a target femto access point using inquiry-mode out of band proximity detection.

FIG. 9 shows a flow diagram of an exemplary method 1900 for facilitating active hand-in of an AT 115 to a target FPS 290 using inquiry-mode OOB proximity detection with the FPS 290 performing the inquiry proactively. The method 1900 begins at stage 1904 by communicating a non-directed proximity request message from a femto-proxy system 290 over an OOB channel. As described above, the femto-proxy system 290 includes an OOB radio 240 and a FAP 230 communicatively coupled with a core network element (e.g., FCS 640). The proximity request message is configured to be received by any of a plurality of ATs 115 when in proximity to the femto-proxy system 290. For example, the proximity request message is a Bluetooth inquiry packet that is broadcast over a Bluetooth channel for receipt by any proximate AT 115 in Bluetooth discoverable mode.

At stage 1908, a proximity response message is received over the OOB channel from one or more of the ATs 115 in response to the proximity request message. The proximity response message indicates that the AT 115 is in proximity to the femto-proxy system 290 (e.g., to the FAP 230). The proximity response message includes an OOB identifier corresponding to the AT 115. For example, the proximity response message includes a Bluetooth address (e.g., BD_ADDR) and a class of device associated with the AT 115.

At stage 1912, an OOB presence indication is determined for the AT 115. If the core network maintains the mapping between the OOB ID and the IMSI, then the FAP 230 uses the OOB ID as the OOB presence indication. Otherwise, with the OOB ID is used to determine the IMSI (see FIGS. 8A, 8C, 8D), then the FAP 230 uses the IMSI as the OOB presence indication.

At stage 1916, an OOB presence indication is communicated from the FAP 230 to the core network element indicating proximity of the AT 115 to the FAP 230.

As described below with reference to FIG. 10, some configurations only send the presence indication when the AT 115 is also in active communications. Various techniques can be used to determine whether the AT 115 is active. For example, having detected presence of the AT 115 over the OOB channel, reverse-link (e.g., RSSI) sensing over macro channels can be used to detect any active ATs 115 in proximity to the FAP. Other selective sending of the presence indication may also be implemented in certain configurations. For example, some configurations may not send an OOB identifier (e.g., BD_ADDR) to the core network 630 for pre-registration when that OOB identifier was already sent within a recent report window (e.g., of some pre-determined duration).

At stage 1920, the method 1900 facilitates active hand-in of the AT 115 from a source macrocell (e.g., macro BTS 105) of the macro network to the FAP 230 in response to receiving a handoff request from the macro network in response to the OOB presence indication. For example, as described with reference to stage 1912, the core network element determines or receives the AT identifier of the AT 115 according to a mapping. Various techniques can be used to register the AT 115 for hand-in and/or to otherwise facilitate hand-in. For example, the FPS 290 maintains an AT mapping 219 between the AT's 115 OOB identifier (e.g., the Bluetooth device address, WiFi MAC address) detected during the detection procedure and an AT identifier, like the AT's IMSI. The FPS 290 may register the AT 115 with the FCS 640 according to the AT's identifier.

Figure 10:
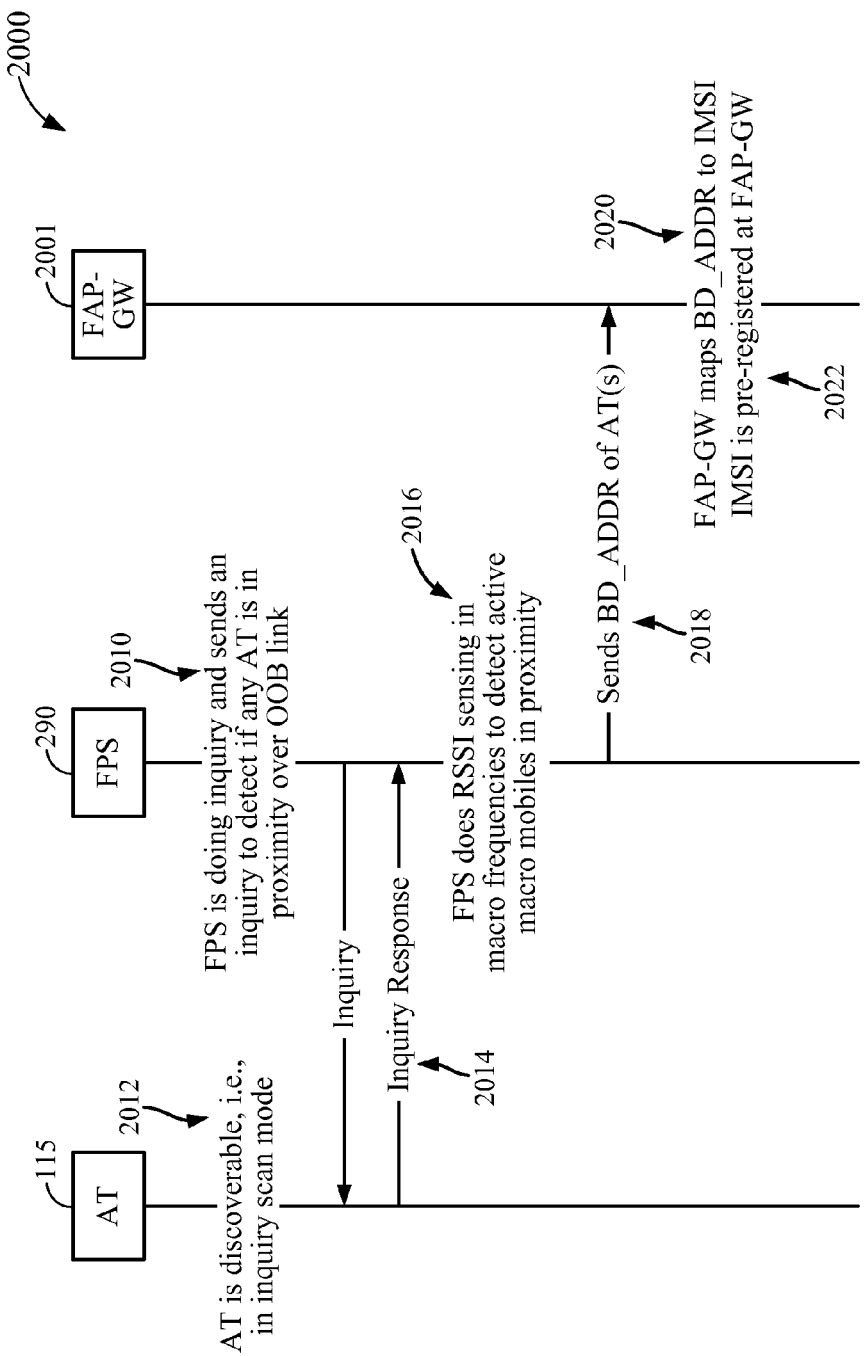
FIG. 10 shows a call flow diagram illustrating an exemplary implementation of part of the method of FIG. 9.

FIG. 10 shows a call flow diagram 2000 illustrating an exemplary implementation of part of the method 1900 of FIG. 9. The call flow diagram 2000 is focused on interactions between an AT 115, a target FPS 290, and a FAP-GW 2001. At stage 2010, the FPS 290 performs inquiry by sending an inquiry over its associated OOB channel (i.e., using the OOB proxy 240) to detect whether any AT 115 (e.g., of a particular CoD) is in proximity. The FPS 290 communicates inquiry packets and waits for inquiry response packets. At stage 2012, the AT 115 is in discoverable mode (e.g., inquiry scan mode), such that it is configured to listen for the inquiry packets and respond when appropriate. The AT 115 may enter the inquiry scan mode due to one or more triggers, as discussed above. At stage 2014, the AT 115 responds with an inquiry response indicating its proximity to the FPS 290. The FPS 290 detects that the device 115 is a mobile device. For example, the FPS 290 analyzes a class of device (CoD) to determine that a mobile device 115 is in proximity to the FPS 290.

At stage 2016, which is an optional stage in the process 2000, the FPS 290 performs RSSI sensing in the macro frequencies to determine whether there are active ATs 115 in proximity to the FPS 290. As discussed above, it may be desirable only to perform these techniques with active hand-in, as idle hand-in may be substantially insensitive to many of the issues involved with handoffs to the wrong target FPS 290 (e.g., there is no active call to drop or file transfer to interrupt). Accordingly, even when an AT 115 is detected in proximity over the OOB channel (e.g., according to stage 2014), it may be desirable to determine whether the detected AT 115 is in active communications. Using reverse-link sensing at stage 2016 can determine whether the AT 115 (or any AT 115 in proximity) is active.

The RSSI sensing at stage 2016 may not always provide accurate results. For example, suppose that a first AT 115 and a second AT 115 are both in proximity to the FPS 290, but only the second AT 115 is in active WWAN communications. At stage 2014, an inquiry response is received from the first AT 115, while the second AT 115 might not respond, e.g., could not be detected for several reasons. At stage 2016, RSSI sensing detects that there is an active macro mobile in the proximity of the FPS 290 but does not resolve whether the active macro mobile is the first AT 115 or the second AT 115. The first AT 115 gets pre-registered for active hand-in even though the second AT 115 needed to be pre-registered. Soft handoffs between proximate FAPs 230 may help alleviate problems associated with detection by a less than optimal one of multiple proximate FAPs 230.

In the event that no active AT 115 is detected with reverse-link sensing at stage 2016, some configurations do not proceed to register the AT 115 for hand-in. For example, the FPS 290 may ignore the inquiry response from the AT 115 or use it only to provide functionality other than proximity detection. If the AT 115 is detected as active in stage 2016, then the OOB identifier (e.g., BD_ADDR) of the AT 115 is sent to the FAP-GW 2001 at stage 2018. The FAP 230 sends the OOB ID of the mobile device 115 to the FAP-GW 2001. For example, the FAP 230 sends the BD_ADDR of the mobile device 115 to the FAP-GW 2001. The FAP 230 may not send the OOB address if the OOB address has been sent recently, e.g., in a report sent during a most-recent window of time.

At stage 2020, the FAP-GW 2001 maps the OOB identifier to an AT identifier for the AT 115 that identifies the AT on the macro network. For example, the BD_ADDR is mapped to the IMSI of the AT 115. The unique mobile identifier (macro address, IMSI) of the mobile device 115 is mapped to the FAP 230 with which the mobile device 115 is near or approaching. The call flow diagram 2000 assumes that the mapping is implemented at the FAP-GW 2001, rather than at the FPS 290 or an enterprise server, though modifications can be made to the call flow diagram 2000 to account for those other techniques according to the descriptions provided above. Having determined (e.g., or received) the AT identifier of the AT 115, the FAP-GW 2001 can pre-register the AT 115 for active hand-in at stage 2022. Later, the FAP-GW 2001 will receive a Handoff Required message and select a FPS 290 as the target FPS 290 for active hand-in (in particular the FAP 230 of the FPS 290 as a target FAP).

The process 2000 will operate on multiple ATs that are detected during FPS inquiry where at least one AT is detected using RSSI. In this case, the FPS 290 will register all of the ATs detected during FPS inquiry.

Figure 11:
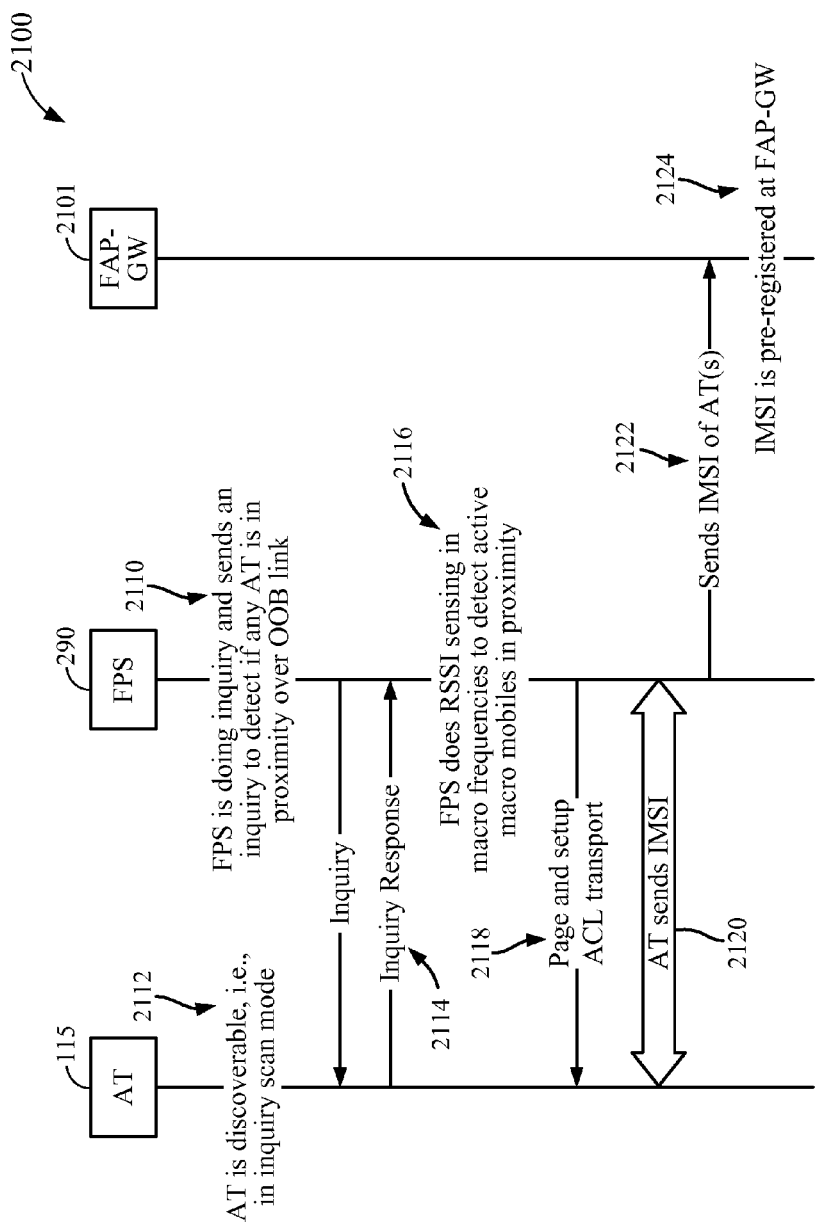
FIG. 11 shows a call flow diagram illustrating another example of part of the method of FIG. 9.

FIG. 11 shows a call flow diagram 2100 illustrating another example of part of the method 1900 of FIG. 9. In the process 2100, stages 2110, 2112, 2114, and 2116 are similar to stages 2010, 2012, 2014, and 2016 discussed above with respect to FIG. 10. In the process 2100, the network element, here a FAP-GW 2101, typically does not have a mapping of OOB addresses of ATs 115 to AT identifiers, e.g., IMSIs.

At stage 2118, the FPS 290 sends a Bluetooth page message to the AT and sets up an ACL transport to the AT 115. The FPS 290 requests the AT identifier from the AT 115 once the ACL transport is set up.

At stage 2120, an application running on the AT 115 sends the IMSI to the FPS 290 over the OOB link established with the FPS 290. At stage 2122, the AT identifier, here the IMSI of the AT 115, is sent to the FAP-GW 2101 by the FAP 230. The FAP 230 may not send the IMSI if the IMSI has been sent recently, e.g., in a report sent during a most-recent window of time.

At stage 2124, the FAP-GW 2101 pre-registers the AT for active hand-in with the AT identifier. The FAP-GW 2101 pre-registers the IMSI by storing the IMSI in association with the FAP 230 that sent the IMSI to the FAP-GW 2101 for future use in selecting the FAP 230 when a handoff requirement message is received. Later, the FAP-GW 2101 will receive a Handoff Required message and select a FAP 230 that is the target FAP for the active hand-in.

Figure 12:
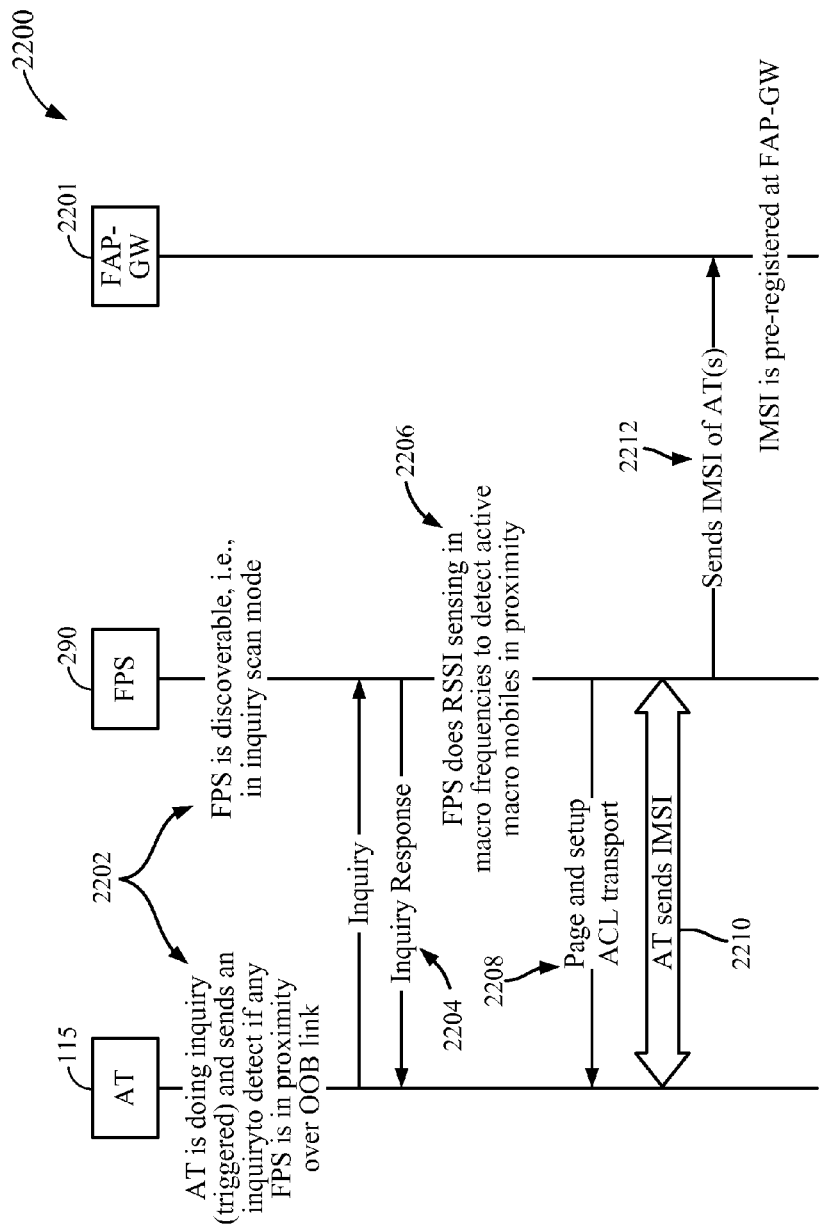

Referring to FIG. 12, a process 2200 of registering an AT 115 for hand-in includes the stages shown. The process 2200 is an example, and may be modified, e.g., by having stages added, removed, and/or rearranged.

At stage 2202, when an AT 115 approaches a femto-proxy including a FPS 290, the mobile device is triggered to send inquiry packets to the FPS 290. Various forms of triggers are possible, e.g., GPS-determined location, RF signature, etc. The FPS 290 is in discoverable mode, preferably always, and responds to the AT 115 at stage 2204.

At stage 2206, the FPS 290 may also determine that an active mobile device 115 is in the FSP's vicinity by RSSI sensing in macro frequencies. The FPS 290 analyzes RSSI values of received signals to determine if there are active ATs 115 in proximity to the FPS 290.

At stage 2208, the FPS 290, in particular the femto-proxy module 240, initiates an OOB link with the AT 115. The FPS 290 sends a page to the AT 115 and sets up an ACL transport with the AT 115.

At stage 2210, the AT 115 sends the unique AT identifier to the FPS 290. With the OOB link established between the FPS 290 and the AT 115, the AT 115 sends the unique identifier, here the IMSI, of the AT 115 from the AT 115 via an application run on the AT 115 to the FPS 290. The first time that the mobile device 115 comes into the vicinity of the FPS 290, the FAP 230 obtains the AT identifier in this manner and stores the AT identifier in a local database (in the FPS 290). For subsequent times that the mobile device 115 comes into the vicinity of the FPS 290, the FPS 290 obtains the AT identifier from the local database.

At stage 2212, however obtained, the FPS 290 sends the AT identifier to the FAP-GW 2401. The FAP-GW 2401 pre-registers the IMSI of the AT 115 at stage 2214 and can use the mapping of the IMSI for the AT 115 with the FPS 290 for use in selecting the FPS 290 for a handoff request for that AT 115 within a time window. If the AT 115 is no longer detected in the vicinity of the FPS 290, then the FPS 290 deregisters the AT 115 from the FAP-GW 2401.

Reactive Approach

Figure 13:
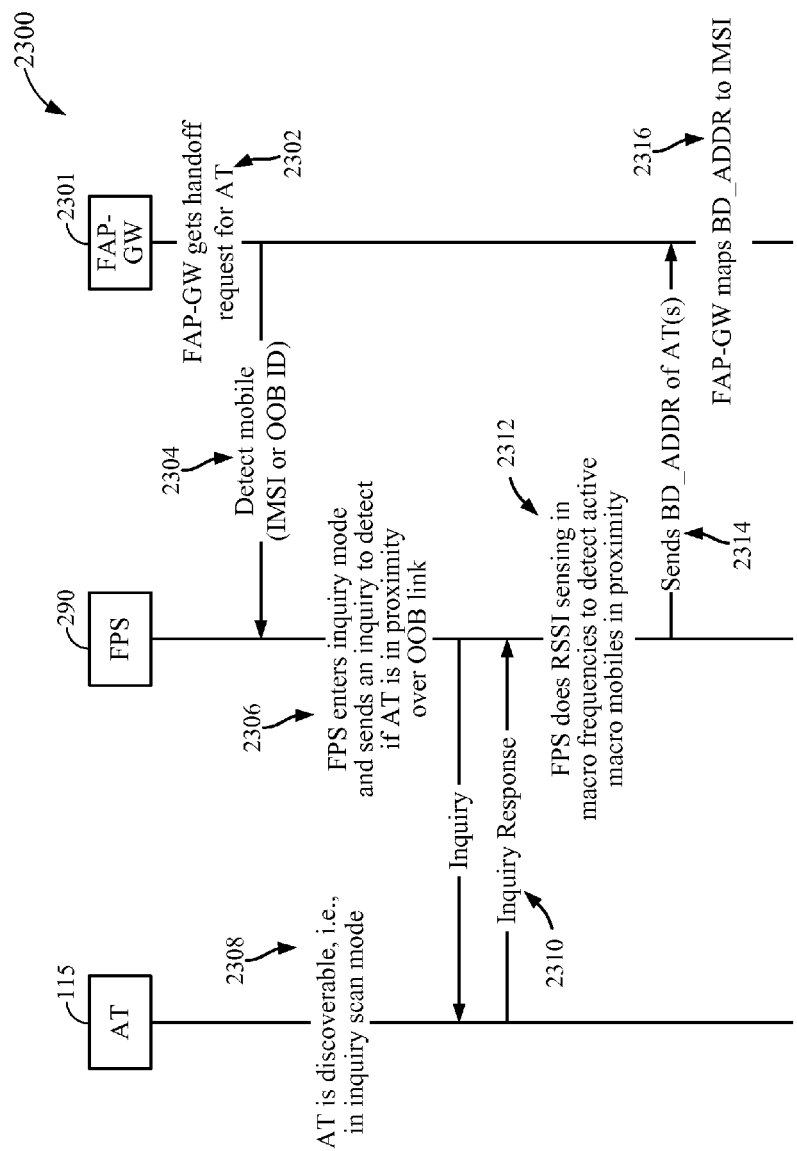
FIG. 13 shows a process of mobile station handoff according to a reactive approach

Referring to FIG. 13, a process 2300 of mobile station handoff according to a reactive approach includes the stages shown. The process 2300 is an example, and may be modified, e.g., by having stages added, removed, and/or rearranged. For example, stage 2306 can occur before stages 2304 and/or 2302.

At stage 2302, a FAP-GW 2301 receives a handoff request for a particular AT 115. The request can be received from the macro network. The request indicates the particular AT 115, as identified by a unique identifier such as the AT's IMSI. The FAP-GW 2301 determines that the particular AT 115 is not presently associated by the FAP-GW 2301 with a FAP for handoff.

At stage 2304, when handoff messages are received by a FAP-GW, the FAP-GW requests each of the FAPs 230 that share the same PN offset (PSC for UMTS) and whose PN offset matches with the ON offset reported in the mobile's PSMM (Pilot Strength Measurement Message) to detect the presence of mobile devices 115. The FAP-GW 2301 sends a "detect-mobile" request to determine if the specific ATs are in the proximity of the candidate FAPs. The FAP-GW 2301 sends the detect-mobile request to cause the FSPs 290 to detect ATs in proximity of (in communication with) the FAPs. The detect-mobile request will include the IMSI if the FPS 290 maintains the mapping between the OOB ID and the IMSI, or the OOB ID otherwise.

At stage 2306, the FPS 290 responds to the detect-mobile request from the FAP-GW 2301 by sending an inquiry to detect ATs 115 in proximity to the FPS 290. The FPS 290 can detect ATs 115 in proximity to the FPS 290 by determining whether the ATs 115 are within OOB range of the FPS 290.

At stage 2308, the AT 115 is discoverable. The AT 115 remains in, or enters, discoverable mode, i.e., inquiry scan mode based on triggers, so that the AT 115 can receive inquiry messages from the FPS 290.

At stage 2310, the AT 115 responds to inquiry messages from the FPS 290. The AT 115 responds by sending an inquiry response to the inquiry message to the FPS 290 that includes the FAP 230. The FPS 290 will determine that a mobile device 115 (as opposed to another type of device, from analysis of the CoD) is in the FPS's vicinity.

At stage 2312, the FPS 290 may also determine that an active mobile device 115 is in the FSP's vicinity by RSSI sensing in macro frequencies. The FPS 290 analyzes RSSI values of received signals to determine if the AT 115 indicated by FAP-GW is in proximity to the FPS 290. This stage may be omitted if the OOB ID was sent by the FAP-GW at stage 2304.

At stage 2314, the FPS 290 sends information regarding the ATs 115 that were detected in proximity of the FPS 290 to the FAP-GW 2301. The FPS 290 sends the OOB address, e.g., the BD_ADDR of the in-proximity ATs 115 received in the inquiry response, to the FAP-GW 2301.

At stage 2316, the core network determines the unique identifier of the in-proximity ATs 115. The FAP-GW 2301 uses the OOB address to map the OOB address to an AT identifier (e.g., IMSI) of the mobile device 115 such that the core network will know which FPS 290 to send the handoff request for the particular mobile device 115.

Figure 14:
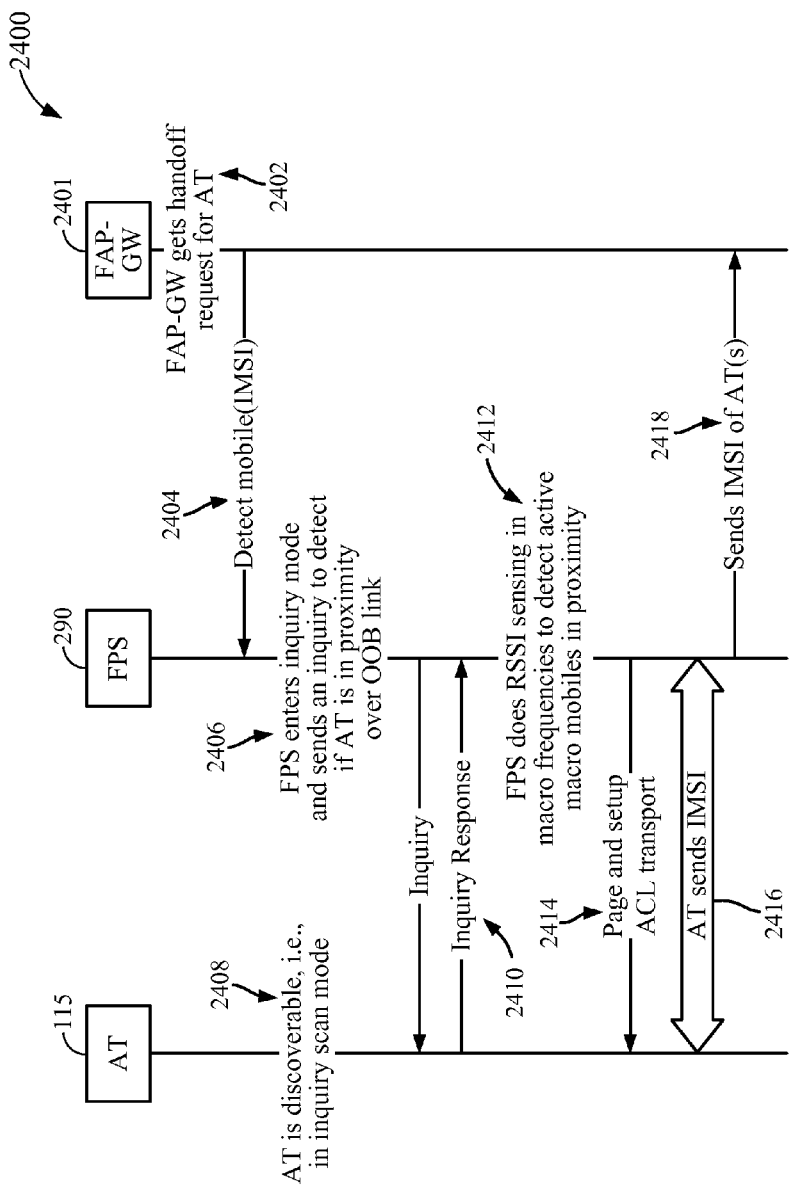
FIG. 14 shows a process of mobile station handoff according to an alternative reactive approach.

Referring to FIG. 14, a process 2400 of mobile station handoff according to an alternative reactive approach includes the stages shown. The process 2400 is an example, and may be modified, e.g., by having stages added, removed, and/or rearranged. For example, stage 2406 can occur before stages 2404 and/or 2402. In the process 2400, stages 2402, 2404, 2406, 2408, 2410, and 2412 are similar to stages 2302, 2304, 2306, 2308, 2310, and 2312, respectively, of the process 2300 shown in FIG. 13. In the process 2400, the FPS 290 obtains the unique mobile device identifier (the AT identifier) from the mobile device 115 via an application run on the mobile device 115.

At stage 2414, the FPS 290 initiates communication over an OOB link with the AT 115. The FPS 290 sends a page to the AT 115 and sets up an ACL transport with the AT 115.

At stage 2416, the AT 115 sends the unique AT identifier to the FPS 290. With the OOB link established between the FPS 290 and the AT 115, the AT 115 sends the unique identifier, here the IMSI, of the AT 115 from the AT 115 via an application run on the AT 115 to the FPS 290. The first time that the mobile device 115 comes into the vicinity of the FPS 290, the FPS 290 obtains the AT identifier in this manner and stores the AT identifier in a local database (in the FPS 290). For subsequent times that the mobile device 115 comes into the vicinity of the FPS 290, the FPS 290 obtains the AT identifier from the local database.

At stage 2418, however obtained, the FPS 290 sends the AT identifier to the FAP-GW 2401. The FAP-GW 2401 can then use the mapping of the IMSI for the AT 115 with the FPS 290 for use in selecting the FPS 290 for the handoff requested at stage 2402.

In the process 2400, with the FAP-GW 2301 requesting the FPS 290 to perform inquiry after the FAP-GW 2401 receives a handoff request, and the FPS 290 detecting the presence of multiple mobile devices 115, the FPS 290 will not know which of the mobile devices 115 is the mobile device 115 of interest unless the mapping between OOB Id (BD_ADDR) and IMSI is stored in the local database at FAP. The FPS 290 pages each of the detected mobile devices 115 to get their AT identifiers or until it connects to the mobile of interest. The FPS 290 can stop paging the mobile devices 115 after an AT identifier is reported by the mobile device application that matches the AT identifier reported by the FAP-GW 2301 for handoff.

Active Hand-In Particulars

Techniques discussed below are particularly useful in active hand-in in enterprise applications. For example, a FAP may choose not to send the BD_ADDR received from an inquiry procedure to the FAP-GW if the RSSI sensing does not detect any active mobile in proximity to the FAP. Thus, responses from idle mobiles are ignored. Further, multiple mobile devices might respond to an inquiry and some of the mobile devices may have already responded earlier. The FSP can filter the responses for mobile devices from which responses have already been received, e.g., recently, within a designated amount of time. Inquiry responses can be filtered at the femto-proxy (preferably for proactive techniques), but it is preferable not to have the mobile devices respond to inquiries from the femto-proxy. Also, page scan (directed to specific devices) and inquiry scan (not directed to a specific device), either continuous or triggered/limited, can be performed together for active hand-in for residential (page scan) and enterprise (inquiry scan) scenarios. If a mobile device enters a discoverable mode for a limited time (e.g., due to platform limitation or operator policy), then an application can trigger the mobile device to reenter the discoverable mode after a timeout time.

It is desirable to keep the number of inquiry responses from the same mobiles down. In an enterprise deployment, a number of FSPs will typically be used to provide coverage for a building. For assisting active macrocell to femtocell hand-in, less than all of the FSPs may be enabled with an OOB radio (e.g., Bluetooth). For example, only those FSPs near the reception and other entrances to the building may be provided with an OOB radio. Thus, not many mobile devices will be in range of the FSPs equipped with an OOB radio for a long time and send inquiry responses. This can help reduce power consumption and interference due to the multiple devices sending inquiries at about the same time.

Other techniques may be used to help limit the number of inquiry responses from mobiles to keep the impact on power consumption down, potentially at a minimum. A limited discoverable mode is used by devices that are discoverable for a limited period of time, during temporary conditions or for a specific event. In this mode, the device can respond to a device that makes a limited inquiry (an inquiry using a limited inquiry access code (LIAC)). A Bluetooth device should not be in limited discoverable mode for more than $T_{GAP}$, e.g., one minute. An HCI_Write_Current_IAC_LAP command is used to create IACs that the local Bluetooth device is simultaneously scanning for during inquiry scans. All Bluetooth devices support at least one IAC (the general inquiry access code (GIAC)) while some Bluetooth devices support additional IACs. The femto-proxy can send out an LIAC and the mobile devices can be in discoverable mode always, or may enter the limited discoverable mode based on triggers. Examples of triggers include, but are not limited to, location (e.g., determined using GPS), macro RF signature (e.g., signal signature of macro cells based on and detected signal strengths), and status (such as during voice call processing where soft handoff is desired).

Enterprise Deployment

Soft handoff can be used between FPSs. In multi-femto deployments, e.g., an enterprise deployment, several FPSs are likely to be deployed on the same floor or multiple floors of a building. These FPSs typically support soft handoff between themselves. Without RSSI sensing, a femto will not know if a mobile device is in an active call. Even with RSSI sensing, the femto will not be known with 100% accuracy whether a detected mobile device is in an active call. For example, one mobile device with its OOB radio off could be detected with RSSI sensing while a second mobile device detected over its OOB radio. An FPS that detects a mobile device using the OOB radio (and RSSI sensing) might not be the preferred target FPS, e.g., being an FPS placed near a building entrance. Using soft handoff between FPSs, however, helps to ensure use of the preferred target FPS.

Other Considerations

The various operations of methods described above may be performed by any suitable means capable of performing the corresponding functions. The means may include various hardware and/or software component(s) and/or module(s), including, but not limited to a circuit, an application specific integrate circuit (ASIC), or processor.

The various illustrative logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The operations of a method or algorithm described may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The functions described may be implemented in hardware, software, firmware, or any combination thereof. If implemented in software, the functions may be stored as one or more instructions on a tangible computer-readable medium. A storage medium may be any available tangible medium that can be accessed by a computer. By way of example, and not limitation, such computer-readable media can comprise RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material.

Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As examples of other implementations, BLE mode may be used. For example, in FIGS. 10, 11, 13, and 14, the OOB proxy 240 sends the inquiry message in legacy Bluetooth mode. In the BLE mode of operation, the OOB proxy 240 would send an advertisement broadcast packet containing the OOB proxy's OOB address on an advertisement channel. The AT 115 would scan for the advertisement packet from the OOB proxy 240 and when the AT 115 receives the advertisement, the AT 115 would know that the AT 115 is in proximity to the OOB proxy 240, and thus the FAP-OOB 290. The AT 115 would initiate a connection with the FAP-OOB 290 and the FAP-OOB 290 would know the OOB ID and that the AT 115 is in proximity to the FAP-OOB 290. If the mapping of the OOB ID to the AT identifier is in the AT 115 (FIGS. 11 and 14), then the AT 115 would send the AT identifier (e.g., IMSI) over the OOB connection to the OOB proxy 240.

As another example of another implementation using the BLE mode of operation, referring to FIG. 12, instead of sending the inquiry in legacy Bluetooth mode as in FIG. 12, the AT 115 could send a BLE advertisement broadcast packet containing the AT's OOB address on an advertisement channel. The OOB proxy 240 would scan for the advertisement packet from the AT 115 and when the OOB proxy 240 receives the advertisement packet the OOB proxy 240 would know that the AT 115 is in proximity to the OOB proxy 240. An OOB connection is established (if non-existent) and the AT 115 sends the AT identifier (e.g., IMSI) over the OOB connection to the OOB proxy 240.

Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Further, the term "exemplary" does not require that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A method for macrocell-to-femtocell hand-in, the method comprising:
    communicating a non-directed proximity request message from a femto-proxy system over an out-of-band (OOB) channel, the proximity request message configured to be received by any of a plurality of access terminals when in proximity to the femto-proxy system, the femto-proxy system comprising an OOB radio and a femtocell communicatively coupled with a core network element;
    receiving a proximity response message over the OOB link from an access terminal of the plurality of access terminals in response to the proximity request message, the proximity response message indicating that the access terminal is in proximity to the femto-proxy system;
    determining whether any of the plurality of access terminals is in active macro network communications after receiving the proximity response message over the OOB channel, wherein determining whether any of the plurality of access terminals is in active macro communications comprises detecting communications over macro channels using reverse-link sensing; and
    communicating a presence indication from the femtocell to the core network element indicating proximity of the access terminal to the femtocell in response to at least one of the plurality of access terminals determined to be proximate is determined to be in active macro communications; and
    facilitating active hand-in of the access terminal from a source macrocell of a macro network to the femtocell.

2. The method of claim 1, wherein:
    the proximity response message includes an OOB identifier of the access terminal; and
    communicating the presence indication comprises communicating the OOB identifier from the femtocell to the core network element.

3. The method of claim 2 further comprising mapping the OOB identifier of the access terminal to an AT identifier identifying the access terminal on the macro network.

4. The method of claim 1, wherein:
    the proximity response message includes an OOB identifier of the access terminal; and
    the femto-proxy system is communicatively coupled with an enterprise server;
    the method further comprises:
        communicating the OOB identifier from the femtocell to the enterprise server;
        determining an access terminal identifier at the enterprise server according to a mapping of OOB identifiers and access terminal identifiers; and
        communicating the presence indication comprises communicating the access terminal identifier from the enterprise server to the core network element.

5. The method of claim 1, wherein:
    the mapping is stored local to the femto-proxy system; and
    communicating the OOB presence indication comprises:
        determining an access terminal identifier at the femto-proxy system according to the mapping; and
        communicating the access terminal identifier from the femto-proxy system to the core network element.

6. The method of claim 1, further comprising receiving, from the one of the plurality of access terminals, an access terminal identifier identifying the access terminal on the macro network, wherein communicating the presence indication comprises communicating the AT identifier.

7. The method of claim 6, wherein the access terminal identifier of the access terminal comprises an International Mobile Subscriber Identity (IMSI).

8. The method of claim 6, wherein the access terminal identifier of the access terminal comprises a Mobile Subscriber Integrated Services Digital Network.

9. The method of claim 1, wherein the OOB link is a short-range wireless communication link.

10. The method of claim 9, wherein:
    the non-directed proximity request message is an inquiry packet; and
    the proximity response message is an inquiry response packet.

11. The method of claim 10 further comprising receiving the non-directed proximity request at an access terminal in discoverable mode.

12. The method of claim 11 wherein the discoverable mode is a limited discoverable mode and the non-directed proximity request comprises a limited inquiry access code.

13. The method of claim 11 wherein the discoverable mode is a limited discoverable mode and the access terminal enters the limited discoverable mode in response to a trigger.

14. The method of claim 1 wherein the receiving comprises receiving the proximity response message over the OOB link from the access terminal of the plurality of access terminals only if the access terminal is of a prescribed class of device.

15. The method of claim 1, further comprising receiving a detect-mobile request from the core network element in response to a handoff request, wherein communicating the non-directed proximity request message is in response to receiving the detect-mobile request.

16. The method of claim 1, wherein communicating the non-directed proximity request message is performed independently of a request from the core network element.

17. A femto-proxy system comprising:
    a femtocell configured to be communicatively coupled with a macro network via a core network element;
    an out-of-band (OOB) proxy communicatively coupled with the femtocell and configured to communicate with a plurality of access terminals over an OOB channel; and
    a communications management subsystem, communicatively coupled with the femtocell and the OOB proxy, and configured to:
        direct the OOB proxy to send a non-directed proximity request message over the OOB channel, the proximity request message configured to be received by any of the plurality of access terminals when in proximity to the femtocell;
        receive a proximity response message over the OOB channel from a particular access terminal of the plurality of access terminals in response to the proximity request message, the proximity response message indicating that the access terminal is in proximity to the femtocell;

determine whether the particular access terminal is in active macro network communication using reverse-link sensing;

direct the femtocell to send a presence indication to the core network element indicating proximity of the particular access terminal to the femtocell in response to the particular access terminal being in active macro network communication; and facilitate active hand-in of the particular access terminal from a source macrocell of the macro network to the femtocell in response to receiving a transfer indication from the macro network in response to the presence indication.

18. The system of claim 17 wherein the communications management subsystem is further configured to send an OOB identifier of the particular access terminal contained in the proximity response message to the core network element.

19. The system of claim 17 wherein the communications management subsystem is further configured to map an OOB identifier of the particular access terminal contained in the proximity response message to an AT identifier identifying the particular access terminal and to include the AT identifier in the presence indication.

20. The system of claim 17 wherein the communications management subsystem is configured to direct the OOB proxy to send the non-directed proximity request message in response to receiving a detect-mobile request from a remote device.

21. The system of claim 17 wherein the communications management subsystem is configured to direct the OOB proxy to send the non-directed proximity request message independently of any request from the core network element.

22. A femto-proxy system comprising:

macro communicating means for communicating with a macro network via a core network element;

out-of-band (OOB) communicating means for communicating with a plurality of access terminals over an OOB channel;

active macro means for determining whether the particular access terminal is in active macro network communication, the active macro means being configured to determine whether the access terminal is in active macro network communication using reverse-link sensing;

presence means for sending a presence indication to the core network element indicating proximity of a particular access terminal to the femto-proxy system, the presence means being for sending the presence indication in response to the particular access terminal being in active macro network communication; and means for facilitating active hand-in of the particular access terminal from a source macrocell of the macro network to the femto-proxy system in response to receiving a transfer indication from the macro network in response to the presence indication.

23. The system of claim 22 further comprising means for directing the OOB communicating means to send a non-directed proximity request message over the OOB channel, the proximity request message configured to be received by any of the plurality of access terminals when in proximity to the femto-proxy system, wherein the OOB communicating means are configured to receive a proximity response message over the OOB channel from a particular access terminal of the plurality of access terminals in response to the proximity request message, the proximity response message indicating that the access terminal is in proximity to the femto-proxy system.

24. The system of claim 22 wherein the presence means are further configured to send an OOB identifier of the particular access terminal contained in the proximity response message to the core network element.

25. The system of claim 22 further comprising means for mapping an OOB identifier of the particular access terminal contained in the proximity response message to an AT identifier identifying the particular access terminal, and the presence means are configured to include the AT identifier in the presence indication.

26. The system of claim 22 wherein the OOB communicating means comprise means for receiving a non-directed proximity request message from the particular access terminal over the OOB channel, the proximity request message configured to be received by any femto-proxy system in proximity to the particular access terminal, the system further comprising means for directing the OOB communicating means to send a proximity response message over the OOB channel to the particular access terminal in response to the proximity request message, the proximity response message indicating that the femto-proxy system is in proximity to the particular access terminal.

27. The system of claim 22 wherein the OOB communicating means are configured to send the non-directed proximity request message in response to receiving a detect-mobile request from a remote device.

28. The system of claim 22 wherein the OOB communicating means are to send the non-directed proximity request message independently of a request from the core network element.

29. A non-transitory computer-readable medium of a femto-proxy system comprising computer-readable instructions configured to cause a computer of the femto-proxy system to:

send, via an out-of-band (OOB) proxy, a non-directed proximity request message over an OOB channel, the proximity request message configured to be received by any of a plurality of access terminals when in proximity to the femto-proxy system;

receive a proximity response message over the OOB channel from a particular access terminal of the plurality of access terminals in response to the proximity request message, the proximity response message indicating that the access terminal is in proximity to the femto-proxy system;

determine whether the particular access terminal is in active macro network communication using reverse-link sensing;

send a presence indication to the core network element indicating proximity of a particular access terminal to the femto-proxy system in response to receipt of a proximity response message over the OOB channel from the particular access terminal of the plurality of access terminals in response to the proximity request message and the particular access terminal being in active macro network communication, the proximity response message indicating that the access terminal is in proximity to the femto-proxy system; and facilitate active hand-in of the particular access terminal from a source macrocell of the macro network to the femto-proxy system in response to receipt a transfer indication from the macro network in response to the presence indication.

30. The computer-readable medium of claim 29 wherein the instructions are configured to cause the OOB proxy to send an OOB identifier of the particular access terminal contained in the proximity response message to the core network element.

31. The computer-readable medium of claim 29 further comprising instructions configured to cause the computer to map an OOB identifier of the particular access terminal contained in the proximity response message to an AT identifier identifying the particular access terminal and to include the AT identifier in the presence indication.

32. The computer-readable medium of claim 29 further comprising instructions configured to cause the computer to direct the OOB proxy to send the non-directed proximity request message in response to receiving a detect-mobile request from a remote device.

33. The computer-readable medium of claim 29 further comprising instructions configured to cause the computer to direct the OOB proxy to send the non-directed proximity request message in response to a trigger that is independent of a request from a macrocell network device.

* * * * *